(12) United States Patent
Park et al.

(10) Patent No.: US 12,458,279 B2
(45) Date of Patent: Nov. 4, 2025

(54) METHOD FOR DETECTING BIOMETRIC INFORMATION AND ELECTRONIC DEVICE SUPPORTING THE SAME

(71) Applicant: SAMSUNG ELECTRONICS CO., LTD., Suwon-si (KR)

(72) Inventors: Jaehyuck Park, Suwon-si (KR); Donghyun Lee, Suwon-si (KR); Hongji Lee, Suwon-si (KR); Daehyeong Lim, Suwon-si (KR); Minkyung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 492 days.

(21) Appl. No.: 17/579,910

(22) Filed: Jan. 20, 2022

(65) Prior Publication Data

US 2022/0354422 A1  Nov. 10, 2022

Related U.S. Application Data

(63) Continuation of application No. PCT/KR2022/000449, filed on Jan. 11, 2022.

(30) Foreign Application Priority Data

May 10, 2021 (KR) .................. 10-2021-0059753

(51) Int. Cl.
  *A61B 5/00* (2006.01)
  *A61B 5/1172* (2016.01)

(52) U.S. Cl.
  CPC .......... *A61B 5/4561* (2013.01); *A61B 5/002* (2013.01); *A61B 5/1172* (2013.01); *A61B 5/681* (2013.01);
  (Continued)

(58) Field of Classification Search
  CPC ..... A61B 5/4561; A61B 5/002; A61B 5/1172; A61B 5/681; A61B 5/7405; A61B 5/742;
  (Continued)

(56) References Cited

U.S. PATENT DOCUMENTS 10,292,653 B2  5/2019 Eom et al.
10,321,874 B2  6/2019 Eom et al.
(Continued)

FOREIGN PATENT DOCUMENTS

CN    110023884    7/2019
JP    2008-167899  7/2008
(Continued)

OTHER PUBLICATIONS

Search Report and issued May 5, 2022 in counterpart International Patent Application No. PCT/KR2022/000449.
(Continued)

*Primary Examiner* — James J Yang
(74) *Attorney, Agent, or Firm* — Nixon & Vanderhye PC

(57) ABSTRACT

An electronic device may include: an output module comprising output circuitry, a communication module comprising communication circuitry configured to communicate with at least one external device, a first sensor configured to sense a biometric signal, a second sensor configured to sense an inertial signal, and a processor operatively connected to the output module, the communication module, the first sensor, and the second sensor. The processor may be configured to determine a location of the electronic device for a body based on a signal transmitted or received with the at least one external device through the communication module in response to sensing the biometric signal, to determine a posture of the electronic device based on information obtained through the second sensor, to determine a measurement posture based on the location and the posture of the
(Continued)

electronic device, and to provide a guide to correspond the measurement posture to a predetermined reference posture.

20 Claims, 23 Drawing Sheets

(52) U.S. Cl.
CPC ............ *A61B 5/7405* (2013.01); *A61B 5/742* (2013.01); *A61B 5/7455* (2013.01); *A61B 2562/0219* (2013.01)

(58) Field of Classification Search
CPC . A61B 5/7455; A61B 2562/0219; A61B 5/00; A61B 5/6844; A61B 5/721; A61B 5/74
See application file for complete search history.

(56) References Cited

U.S. PATENT DOCUMENTS

| | | | |
|---|---|---|---|
| 10,765,366 B2 | 9/2020 | Adachi et al. | |
| 10,768,691 B2 | 9/2020 | Ranieri et al. | |
| 11,064,944 B2 | 7/2021 | Eom et al. | |
| 2004/0077958 A1 | 4/2004 | Kato et al. | |
| 2015/0145673 A1* | 5/2015 | Choi .................. | A61B 5/0082 340/539.12 |
| 2016/0183869 A1* | 6/2016 | Oh .................. | A61B 5/681 600/595 |
| 2017/0172431 A1 | 6/2017 | Kim et al. | |
| 2019/0200932 A1 | 7/2019 | Noh et al. | |
| 2019/0223735 A1 | 7/2019 | Lee et al. | |
| 2019/0313916 A1 | 10/2019 | Oh et al. | |
| 2019/0387978 A1 | 12/2019 | Kitamura et al. | |
| 2021/0052221 A1* | 2/2021 | Panneer Selvam ... | A61B 5/1117 |
| 2021/0076971 A1* | 3/2021 | Oloumi .............. | A61B 5/0205 |
| 2022/0160309 A1* | 5/2022 | Poltorak .............. | A61B 5/7264 |

FOREIGN PATENT DOCUMENTS

| | | |
|---|---|---|
| JP | 4633745 | 2/2011 |
| JP | 2016-054888 | 5/2016 |
| JP | 6164309 | 7/2017 |
| KR | 10-2017-0073051 | 5/2017 |
| KR | 10-2019-0081650 | 7/2019 |
| KR | 10-2019-0088847 | 7/2019 |
| KR | 10-2020-0078955 | 7/2020 |
| KR | 10-2360026 | 2/2022 |

OTHER PUBLICATIONS

Extended Search Report dated Sep. 25, 2024 in European Patent Application No. 22807579.2.

\* cited by examiner

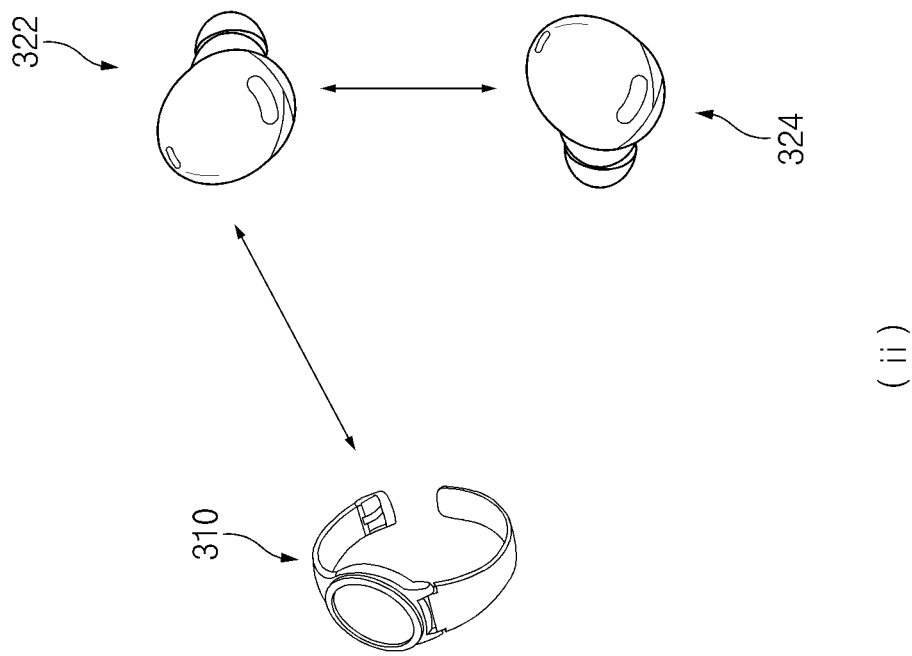
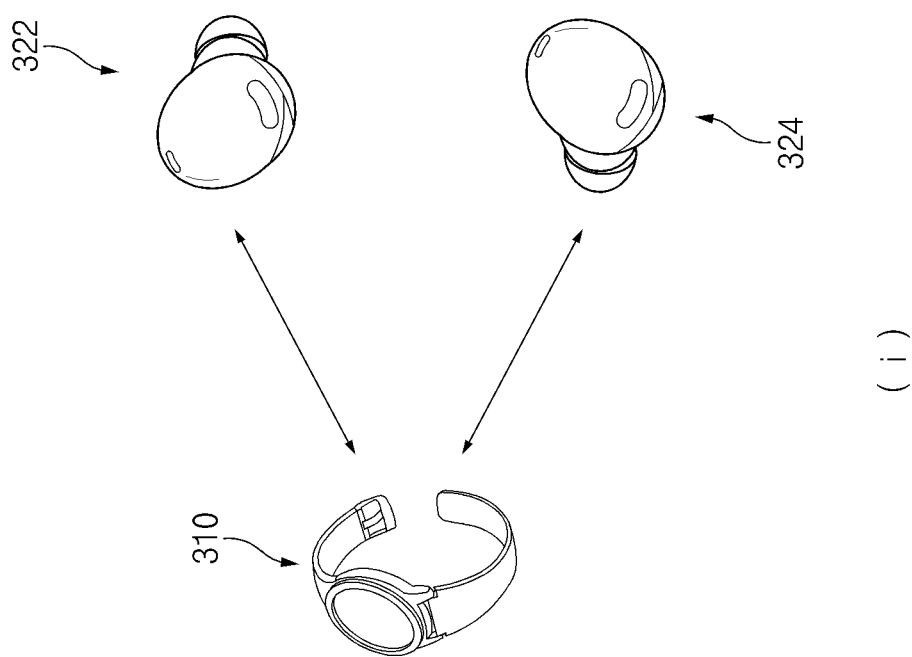
FIG. 3B

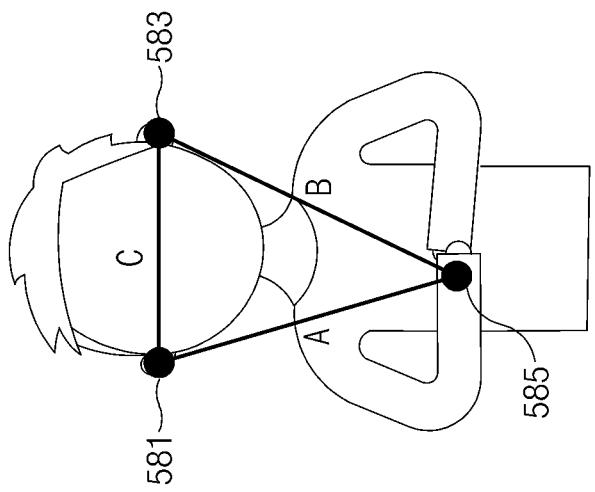
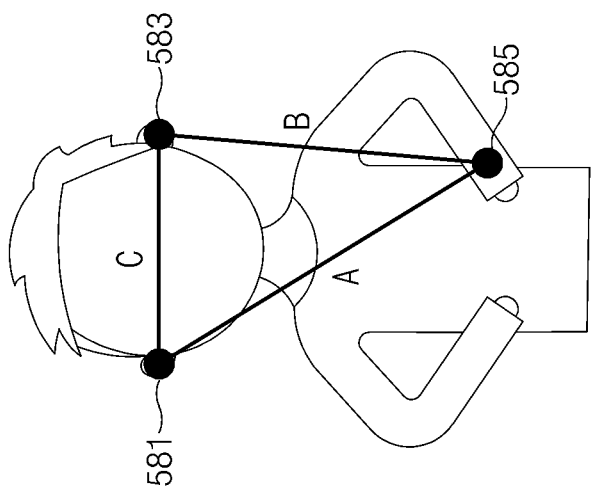
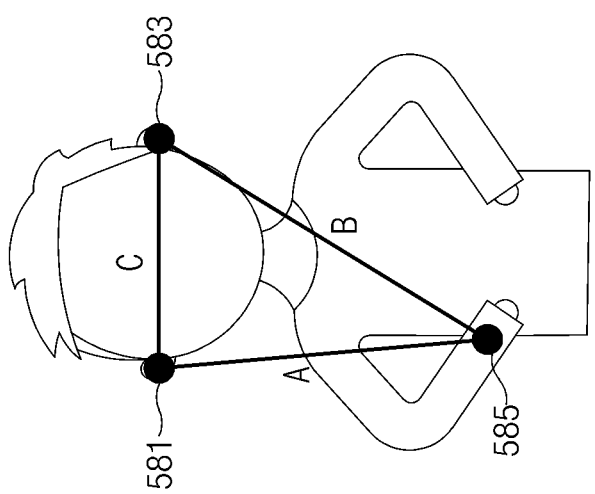
FIG.5B

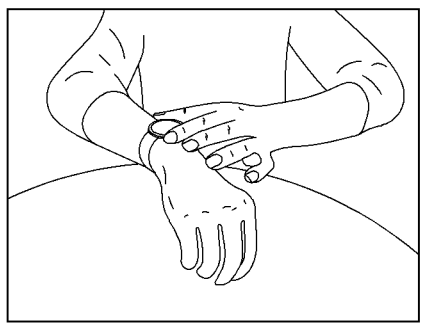 
(i) (ii)
FIG.8B

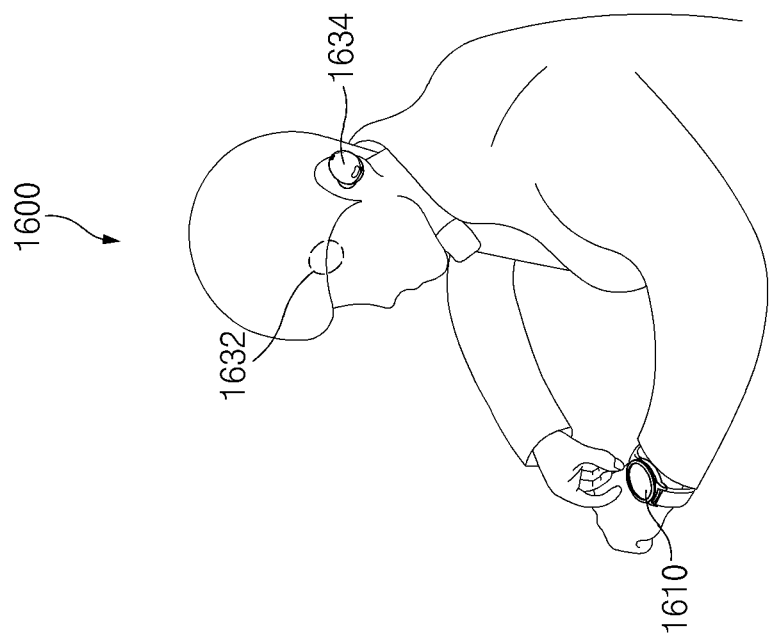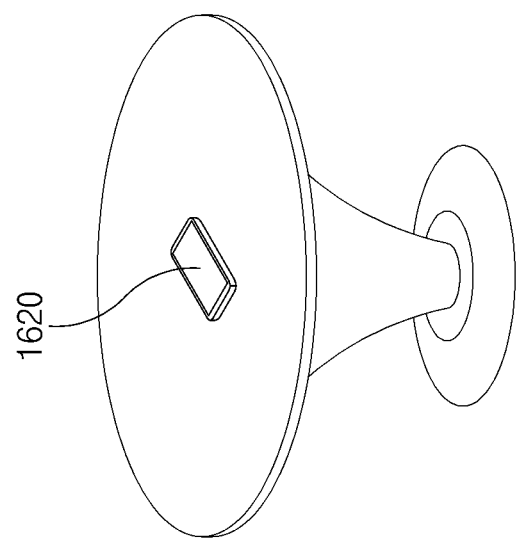
FIG. 16

METHOD FOR DETECTING BIOMETRIC INFORMATION AND ELECTRONIC DEVICE SUPPORTING THE SAME

CROSS-REFERENCE TO RELATED APPLICATIONS

This application is a continuation of International Application No. PCT/KR2022/000449 designating the United States, filed on Jan. 11, 2022, in the Korean Intellectual Property Receiving Office and claiming priority to Korean Patent Application No. 10-2021-0059753, filed on May 10, 2021, in the Korean Intellectual Property Office, the disclosures of which are incorporated by reference herein in their entireties.

BACKGROUND

Field

The disclosure relates to an electronic device. For example, the disclosure relates to a method for detecting biometric information and an electronic device supporting the same.

Description of Related Art

While performing identical or diverse functions, electronic devices are increasingly miniaturized. Accordingly, it is easy to carry an electronic device. These electronic devices are generally accommodated and carried in a user's pocket. However, the electronic devices may be operated while being worn on a wrist or worn on a head or arm of a human body.

Besides, to measure biometric information (e.g., health data), a biometric sensor (e.g., a health care sensor) may be mounted in an electronic device.

The above-described electronic device may measure biometric information based on a bioelectrical impedance analysis (BIA) signal, a photoplethysmogram (PPG) signal or an electrocardiogram (ECG) signal, or an electrodermal activity (EDA) signal. For example, the electronic device may measure various types of biometric information such as body composition, oxygen saturation, blood pressure, heart rate, electrocardiogram, skin moisture, galvanic skin response, electrocardiography, bioelectrical impedance, electromyography, electroencephalography, or electrooculography.

However, the measurement accuracy of biometric information may vary depending on the posture of a subject (or a user) when biometric information is measured. For example, when biometric information is measured, at least one of an extent to which the user's arms are bent, an extent to which the user's arms are spaced from a torso, and/or heights of the user's arms may affect the measurement accuracy of biometric information.

SUMMARY

Embodiments of the disclosure provide a method for detecting biometric information for guiding a user's measurement posture to correspond to a predetermined reference posture when biometric information is measured to measure highly-reliable biometric information, and an electronic device supporting the same.

According to various example embodiments, an electronic device may include: an output module comprising output circuitry, a communication module comprising communication circuitry configured to communicate with at least one external device, a first sensor configured to sense a biometric signal for a body, a second sensor configured to sense an inertial signal, and a processor operatively connected to the output module, the communication module, the first sensor, and the second sensor. The processor may be configured to: determine a location of the electronic device for a body based on a signal transmitted or received with the at least one external device through the communication module in response to sensing the biometric signal through the first sensor, determine a posture of the electronic device based on information obtained through the second sensor, determine a measurement posture of a user based on the location of the electronic device and the posture of the electronic device, and to provide a guide such that the measurement posture corresponds to a predetermined reference posture.

According to various example embodiments, a biometric information measuring system may include an electronic device including: a first sensor configured to obtain a biometric signal, a second sensor configured to sense an inertial signal, and a communication module comprising communication circuitry, the electronic device being configured to be worn on a first portion of a body, a first external device configured to communicate with the electronic device wherein the first external device is configured to be worn on a second portion different from the first portion of the body, and a second external device configured to communicate with the electronic device wherein the second external device is configured to be worn on a third portion different from the second portion of the body. The electronic device may be configured to: determine a posture of the electronic device based on information obtained through the second sensor, determine a location of the electronic device based on a signal transmitted or received with the first external device and the second external device, determine a measurement posture of the user based on the location of the electronic device and the posture of the electronic device, guide the measurement posture to correspond to a predetermined reference posture, and to measure biometric information based on a biometric signal obtained through the first sensor based on the measurement posture corresponding to a predetermined reference posture.

According to various example embodiments, a method of operating an electronic device may include: determining a location of the electronic device for a body based on a signal transmitted or received with at least one external device in response to sensing a biometric information measurement event, determining a posture of the electronic device based on an inertial signal associated with the electronic device, determining a measurement posture of a user based on the location of the electronic device and the posture of the electronic device, and providing a guide such that the measurement posture corresponds to a predetermined reference posture.

According to various example embodiments, an electronic device may guide the measurement posture of a user to correspond to a predetermined reference posture when measuring biometric information and may measure highly-reliable biometric information.

Effects capable of being obtained in this disclosure are not limited to the above-mentioned effects.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3B is a diagram illustrating an electronic device and an external device, according to various embodiments;

FIG. 5B is a diagram for illustrating an example location of an electronic device, according to various embodiments;

FIG. 8B is a diagram illustrating a user's measurement posture determined by fingerprint information, according to various embodiments;

FIG. 16 is a diagram illustrating an electronic device, a guide device, and an external device, according to various embodiments.

Figure 1:
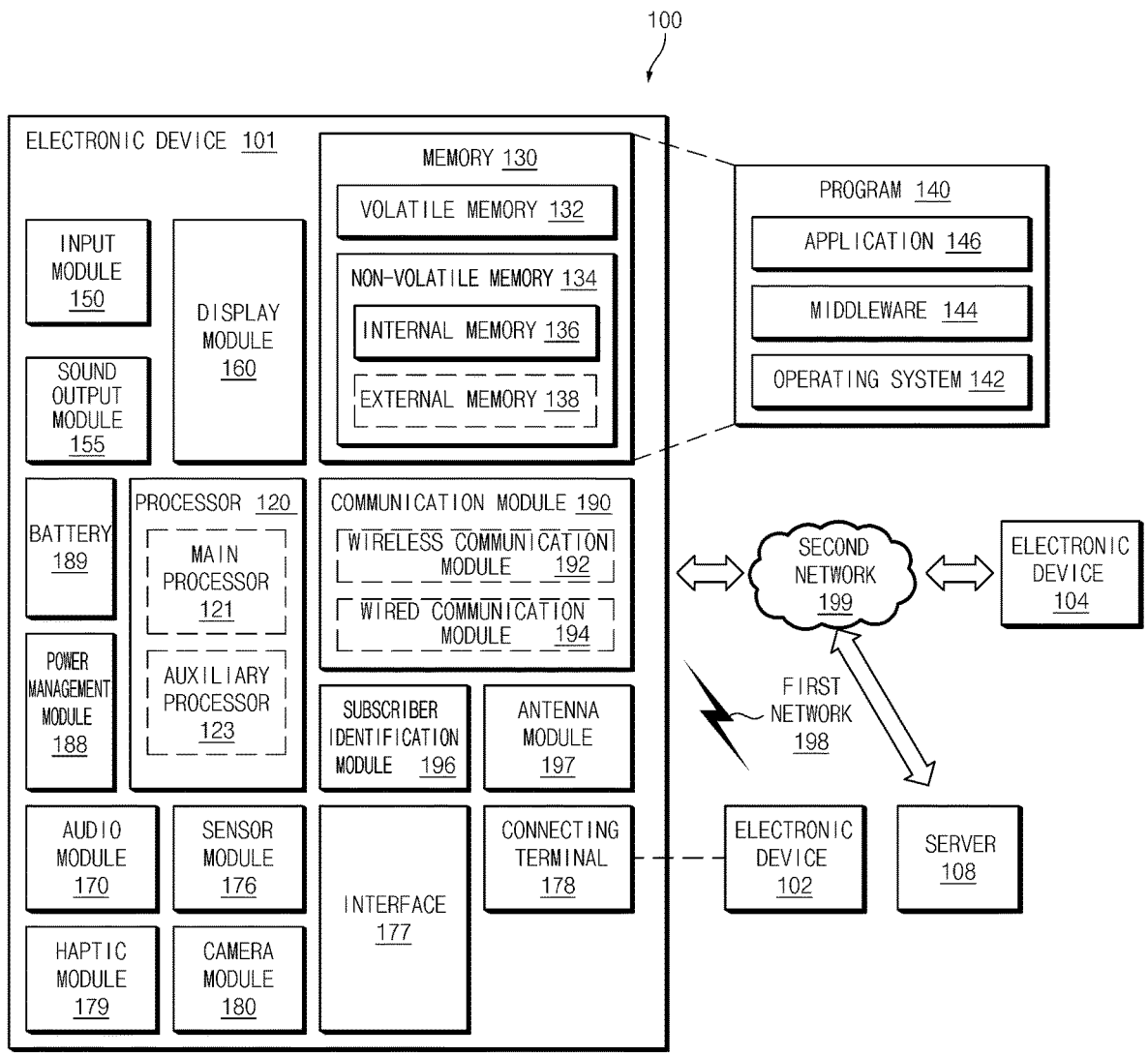
FIG. 1 is a block diagram illustrating an example electronic device in a network environment according to various embodiments.

With regard to description of drawings, the same or similar components will be marked by the same or similar reference signs.

DETAILED DESCRIPTION

Below, various example embodiments of the disclosure may be described with reference to accompanying drawings. Accordingly, those of ordinary skill in the art will recognize that various modifications, equivalents, and/or alternatives on the various example embodiments described herein may be variously made without departing from the scope and spirit of the disclosure. With regard to description of drawings, similar components may be marked by similar reference numerals.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199

(e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element include a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
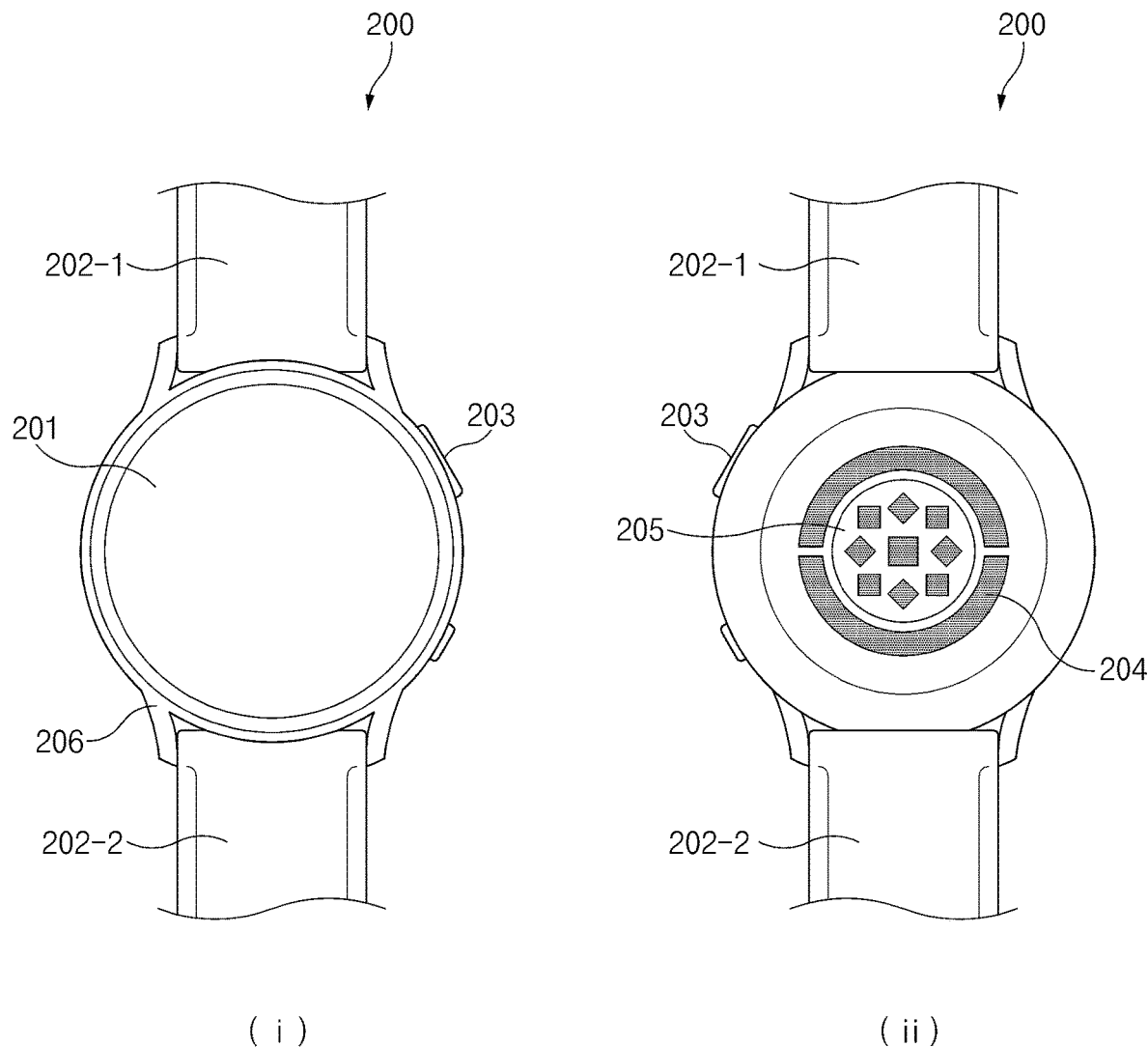
FIG. 2 is a diagram illustrating an example electronic device, according to various embodiments.

FIG. 2 is a diagram illustrating an example electronic device, according to various embodiments.

Referring to FIG. 2, an electronic device 200 (e.g., the electronic device 101 of FIG. 1) may be a watch-type wearable device worn on a body portion (e.g., a wrist). However, this is only an example, and various embodiments of this disclosure are not limited thereto. For example, the electronic device 200 may be implemented with various types of wearable devices such as a shape of a band or a ring.

According to various embodiments, the electronic device 200 may include housing 206, a display 201, a binding member (e.g., a strap or band) 202, a first electrode 203, a second electrode 204, and an optical sensor 205. However, this is only an example, and various embodiments of this disclosure are not limited thereto. For example, the electronic device 200 may be implemented to further include configurations not illustrated in FIG. 2 or not to include at least one of the configurations illustrated in FIG. 2. Furthermore, at least one of the above-described configurations may be implemented with a plurality of components.

According to various embodiments, the housing 206 may form the exterior of the electronic device 200. For example, the housing 206 may include a first surface (e.g., a front surface), a second surface (e.g., a rear surface) and a third surface (e.g., a side surface) surrounding a space between the first surface and second surface. At least some of the above-described configurations may be visually viewable through the housing 206.

According to an embodiment, as shown in (i) of FIG. 2, the display 201 may be visually viewable through a first surface of the housing 206. According to an embodiment, as shown in (ii) of FIG. 2, the second electrode 204 and the optical sensor 205 may be visually viewable through the second surface of the housing 206. According to an embodiment, as shown in (i) and (ii) of FIG. 2, the first electrode 203 may be visually viewable through the third surface of the housing 206. However, this is only an example, and various embodiments of the disclosure are not limited thereto. For example, at least one of the display 201, the first electrode 203, the second electrode 204, and the optical sensor 205 may be disposed at a location different from the above-described location.

According to various embodiments, the display 201 may be configured to provide a user with visual information (e.g., a text, an image, a video, an icon, a symbol, or the like) and to receive a user input (e.g., a touch input).

According to various embodiments, the binding member (e.g., a strap or band) 202 may be connected to the housing 206, and may be configured to detachably attach the electronic device 200 to the user's body portion (e.g., a wrist). The binding member 202 may include a strap member configured to be bent so as to wrap a portion of the user's body. For example, as shown in FIG. 2, the binding member 202 may include a first binding member 202-1 and a second binding member 202-2.

According to various embodiments, the electronic device 200 may obtain biometric information through the first electrode 203, the second electrode 204, and/or the optical sensor 205.

According to an embodiment, while the second surface of the housing 206 is in contact with a portion of a body, the optical sensor 205 may emit light toward the body and then may detect light reflected from the body. In this regard, the electronic device 200 may measure various kinds of biometric information such as blood pressure, oxygen saturation, heart rate, electrocardiogram, skin moisture, or the like, based on the detected light.

According to an embodiment, when the electronic device 200 is worn on a portion of the body, the second electrode 204 exposed through the second surface of the housing 206 may be in contact with the portion of the body. In this state, when the first electrode 203 exposed through the third surface of the housing 206 is in contact with another portion of the body (e.g., a finger), a closed loop in which the first electrode 203, the body, and the second electrode 204 are connected to one another may be formed. In various embodiments of this disclosure, the "closed loop" may refer, for example, to an electrical path formed as the electronic device 200 is in contact with the user's body. In this regard, the electronic device 200 may measure various types of biometric information such as galvanic skin response, electrocardiography, bioelectrical impedance, electromyography, electroencephalography, or electrooculography, based on a current flowing into the closed loop.

According to various embodiments, as will be described in greater detail with reference to drawings below, the electronic device 200 may guide a reference posture required when biometric information is measured, with regard to biometric information measurement.

According to an embodiment, to obtain biometric information having the accuracy of a specific level or higher, the reference posture may be a posture that needs to be taken by the electronic device 200 (or a user). Information associated with this reference posture may also be obtained from the inside (e.g., a memory) or the outside (e.g., a health management server) of the electronic device 200.

For example, the electronic device 200 may guide a location (or the user's posture) of the electronic device 200 so as to be spaced from a specified portion of the body by a specific interval. As another example, the electronic device 200 may guide the direction of the electronic device 200 so as to be positioned toward the body. For example, the guide information may be provided as visual information. However, this is only an example, and this disclosure is not limited thereto, and the guide information may be provided in various forms such as auditory information or tactile information.

Figure 3A:
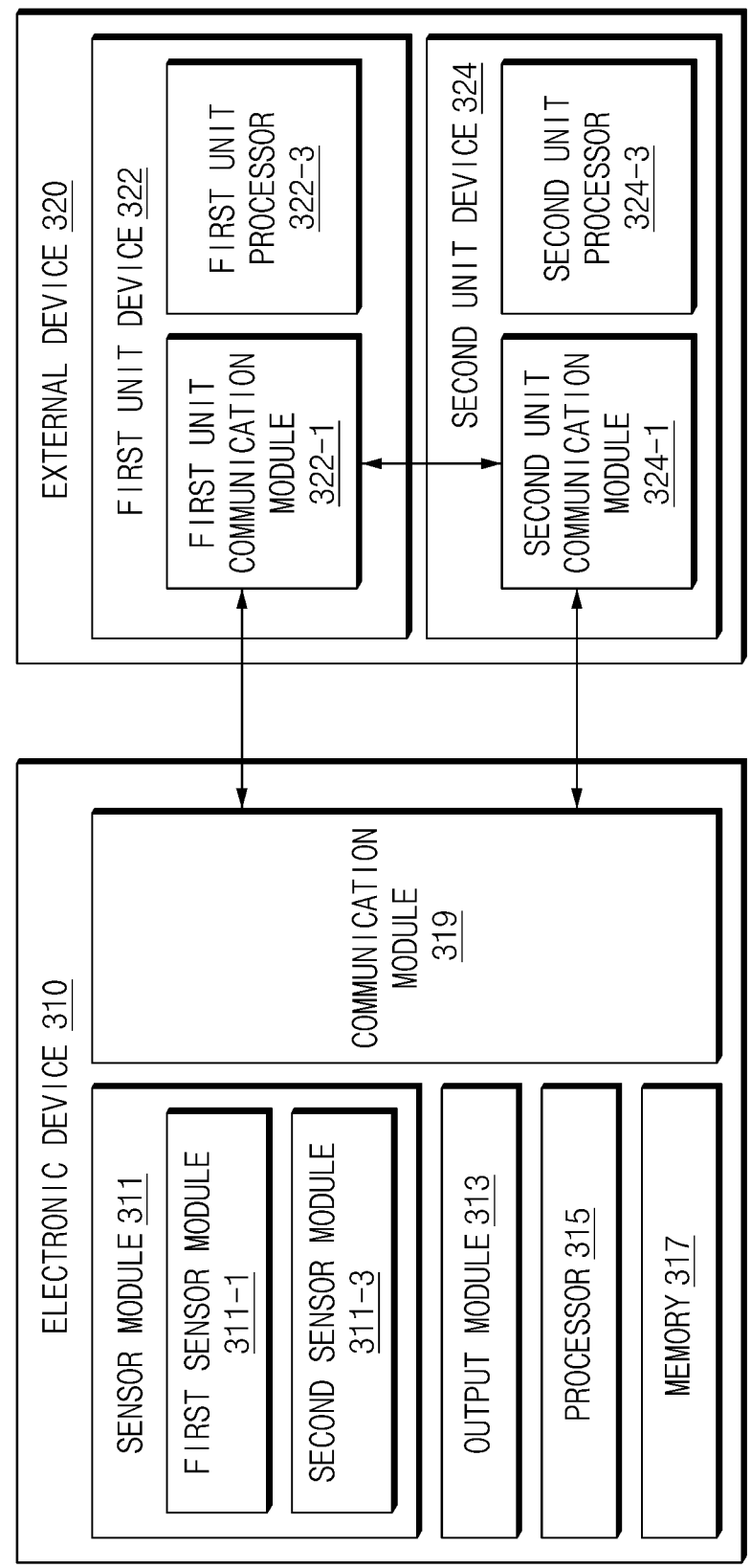
FIG. 3A is a block diagram illustrating an example configuration of a biometric information measuring system, according to various embodiments.
Figure 4A:
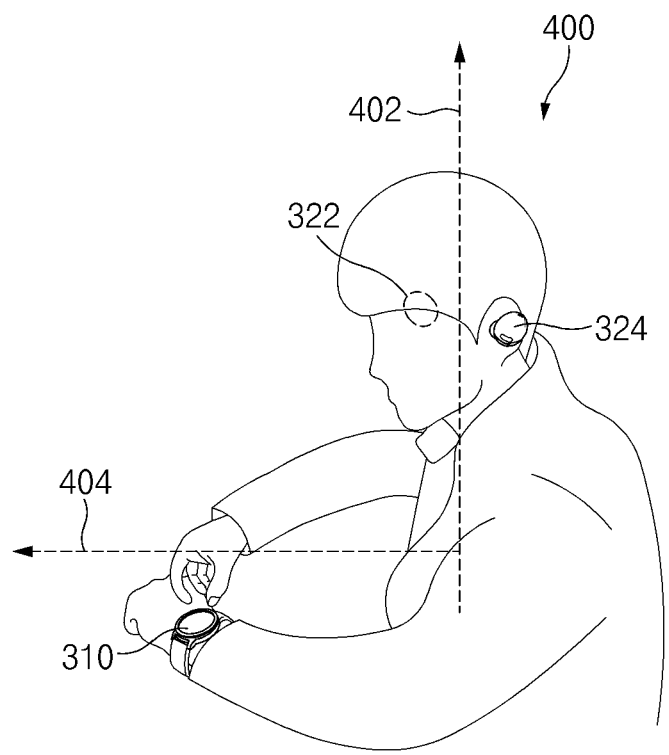
FIG. 4A is a diagram illustrating a state in which an electronic device and an external device are worn on a user, according to various embodiments.
Figure 4B:
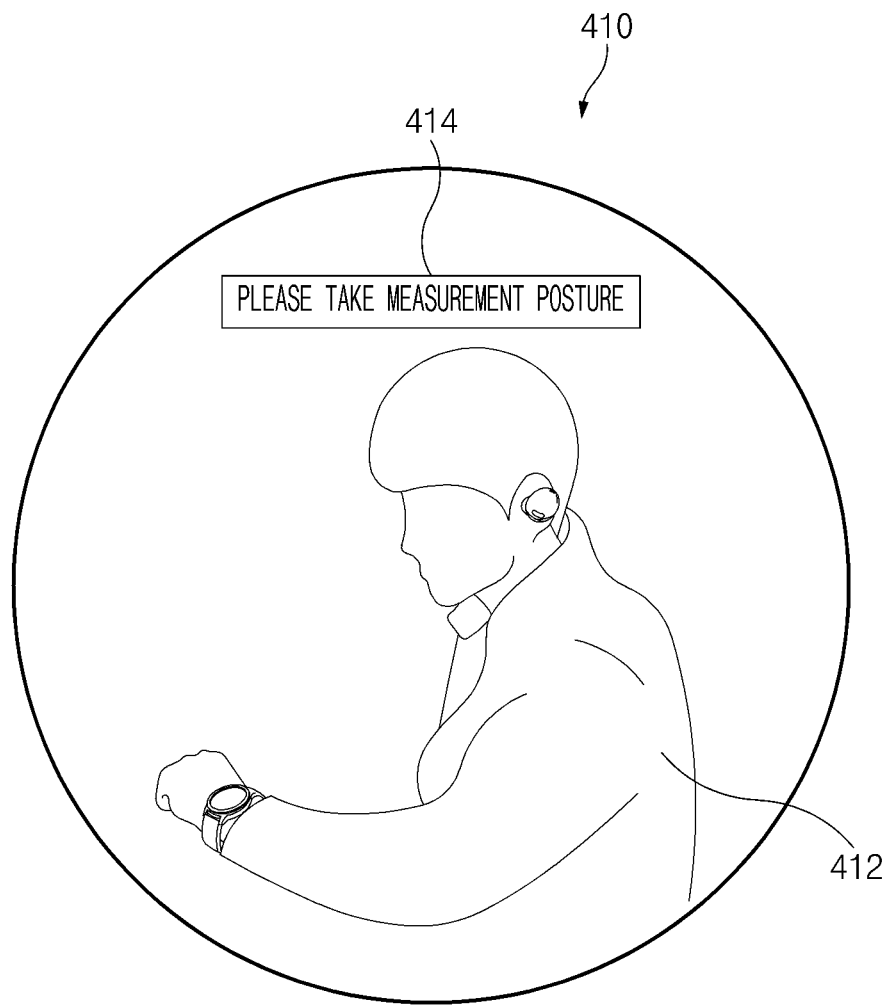
FIGS. 4B, 4C and 4D are diagrams illustrating an example operation of measuring biometric information of an electronic device, according to various embodiments.
Figure 4C:
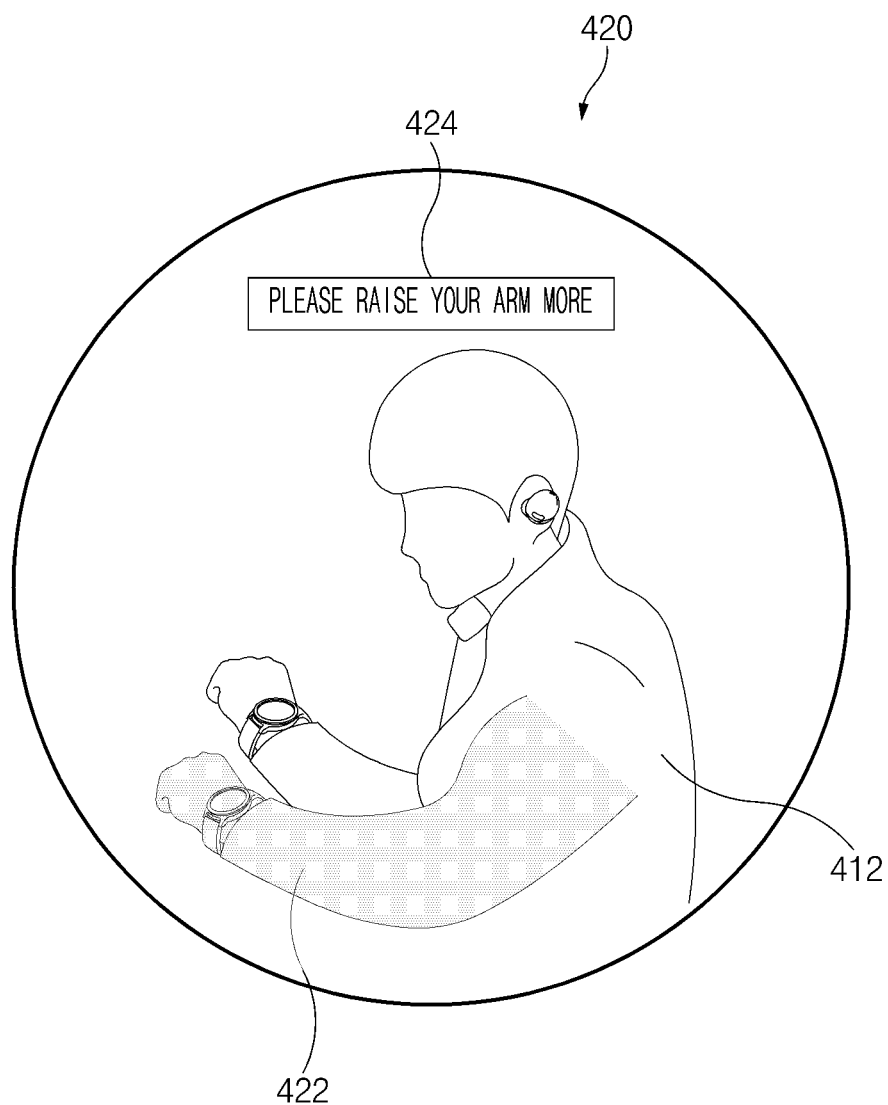
Figure 4D:
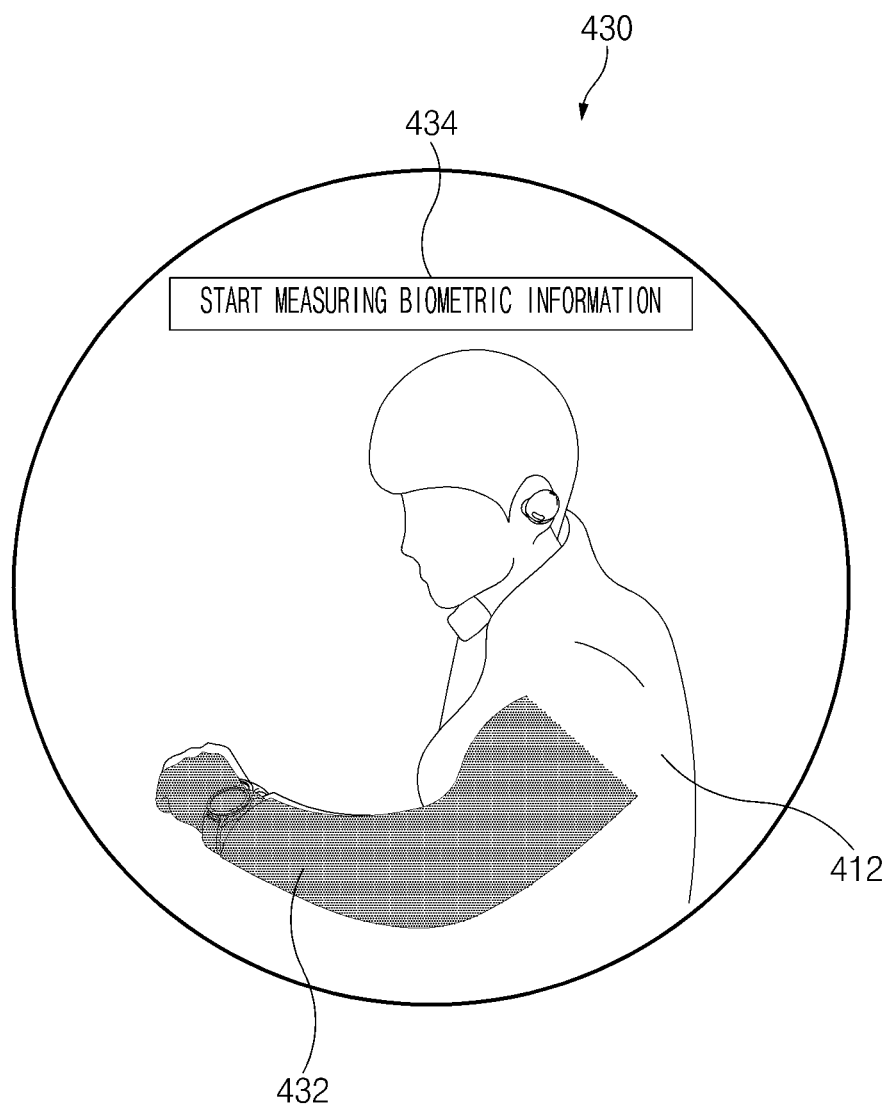

FIG. 3A is a block diagram illustrating an example configuration of a biometric information measuring system, according to various embodiments. FIG. 3B is a diagram illustrating an electronic device and an external device, according to various embodiments. FIG. 4A is a diagram illustrating a state in which an electronic device and an external device are worn on a user, according to various embodiments. FIGS. 4B, 4C and 4D are diagrams illustrating an example operation of measuring biometric information of an electronic device, according to various embodiments.

Referring to FIG. 3A, a biometric information measuring system 300 according to various embodiments may include an electronic device 310 (e.g., the electronic device 101 of FIG. 1 or the electronic device 200 of FIG. 2) and an external device 320 (e.g., the electronic device 102 of FIG. 1).

According to various embodiments, as shown in FIG. 3B, the electronic device 310 may be implemented with a watch-type wearable device worn on a first portion of a body (e.g., a wrist). The external device 320 may be an earphone-type wearable device worn on a second portion (e.g., an ear) different from the first portion of the body, and may include a first unit device 322 (e.g., a right unit or right earphone) and a second unit device 324 (e.g., a left unit or left earphone). As shown in FIG. 4A, in a state 400 where a user wears the electronic device 310 and the external device 320 (e.g., the first unit device 322 and the second unit device 324), biometric information may be measured by taking a measurement posture (e.g., a posture with arms outstretched forward while the arms are opened).

However, this is only an example, and various embodiments of this disclosure are not limited thereto. For example, the external device 320 may be implemented with a wearable device in a form of glasses including two temples. In this case, the first temple (e.g., a right temple) of the external device 320 may correspond to the first unit device 322 and the second temple (e.g., a left temple) of the external device 320 may correspond to the second unit device 324. Also, the first unit device 322 and the second unit device 324 may be implemented with different external devices. For example, the first unit device 322 may be a wearable device in a form of an earphone, and the second unit device 324 may be a wearable device in a form of glasses.

According to various embodiments, the electronic device 310 (e.g., the electronic device 200) may include a sensor module (e.g., including at least one sensor) 311, an output module (e.g., including output circuitry) 313, a processor (e.g., including processing circuitry) 315, a memory 317, and/or a communication module (e.g., including communication circuitry) 319.

Configurations of the electronic device 310 described above are examples, and various embodiments of the disclosure are not limited thereto. For example, the electronic device 310 may be implemented to further include configurations not illustrated in FIG. 3A or not to include at least one of the configurations illustrated in FIG. 3A. For example, the electronic device 310 may be the electronic device 101 shown in FIG. 1. The electronic device 310 may include at least one input module (e.g., the input module 150), at least one camera module (e.g., the camera module 180), or a power management module (e.g., the power management module 188).

The sensor module 311 may include a plurality of sensor modules each including at least one sensor. According to various embodiments, the sensor module 311 may obtain (or detect) information associated with the posture of the electronic device 310 and/or the state of the user and may generate an electrical signal or a data value corresponding to the obtained information.

According to an embodiment, the information associated with the posture of the electronic device 310 may be associated with the movement (or inertial force) of the electronic device 310. In this regard, the sensor module 311 may include a first sensor module 311-1 including at least one of an acceleration sensor, a gyro sensor, a gesture sensor, and a barometric pressure sensor for obtaining posture information of the electronic device 310.

According to an embodiment, the information associated with the user's state may include biometric information. In this regard, the sensor module 311 may include a second sensor module 311-3 including a biometric sensor for obtaining biometric information. For example, the biometric sensor may include the first electrode 203, the second electrode 204, and the optical sensor 205 described above with reference to FIG. 2. In addition to the above-described biometric sensor, another type of a biometric sensor (e.g., a fingerprint sensor) may be implemented with a configuration of the second sensor module 311-3.

The output module 313 may include various output circuitry and output various pieces of information under the control of the processor 315. At least some of various pieces of information may be associated with an operation of obtaining biometric information. According to various embodiments, the output module 313 may be an output device that outputs auditory information, tactile information, or visual information, and may include at least one of a sound output module (e.g., the sound output module 155 of FIG. 1), a haptic module (e.g., the haptic module 179 of FIG. 1) or a display module (e.g., the display module 160 of FIG. 1).

The communication module 319 may include various communication circuitry and support the execution of wireless communication with the at least one external device 320. According to various embodiments, the communication module 319 may be a device including hardware and software for transmitting and receiving a signal (e.g., commands or data) between the electronic device 310 and the at least one external device 320.

According to an embodiment, the communication module 319 may include a communication module for supporting ultra-wide band (UWB) communication. For example, to support UWB communication operation capable of transmitting or receiving large amounts of information (e.g., signal or data) with low power using a wide frequency band (e.g., 3.1 GHz to 10.6 GHz), the communication module 319 may include an antenna module including a plurality of antennas. However, this is only an example, and various embodiments of this disclosure are not limited thereto. For example, the communication module 319 may include an infrared data association (IrDA) communication module, a wireless fidelity (Wi-Fi) communication module, a Wi-Fi Direct communication module, or Bluetooth communication module.

The processor 315 may be operatively connected to the sensor module 311, the output module 313, the communication module 319, and/or the memory 317, and may control various components (e.g., hardware or software components) of the electronic device 310.

According to various embodiments, the processor 315 may include various processing circuitry and measure (or obtain) biometric information based on information obtained through the sensor module 311 (e.g., the second sensor module 311-3). For example, the processor 315 may measure various types of biometric information such as body composition, oxygen saturation, blood pressure, heart rate, electrocardiogram, skin moisture, galvanic skin response, electrocardiography, bioelectrical impedance, electromyography, electroencephalography, or electrooculography. In this regard, the processor 315 may obtain at least one of a bioelectrical impedance analysis (BIA) signal, a photoplethysmogram (PPG) signal or an electrocardiogram (ECG) signal, or an electrodermal activity (EDA) signal, and may measure biometric information based on the obtained at least one signal.

According to various embodiments, the processor 315 may determine (or identify) a measurement posture of a user when measuring biometric information. The measurement posture may be a posture taken by the user to measure the biometric information. For example, the processor 315 may determine at least one of an extent to which the user's arms are bent, an extent to which the user's arms are spaced from a torso, heights of the user's arms, an angle between the user's arms, or directions of the user's arms. For example, the processor 315 may determine the measurement posture based on the location of the electronic device 310 and the posture of the electronic device 310.

According to an embodiment, the processor 315 may determine the location of the electronic device 310 based on the signal transmitted and received with the external device 320 (e.g., the first unit device 322 and the second unit device 324) through the communication module 319. The processor 315 may determine the location of the electronic device 310 based on first distance information between the electronic device 310 and the first unit device 322, which is obtained based on UWB communication, second distance information between the electronic device 310 and the second unit device 324, and third distance information between the first unit device 322 and the second unit device 324.

For example, through a ranging-related algorithm, the processor 315 may obtain the first distance information by transmitting and receiving a predetermined signal with the first unit device 322 and may obtain the second distance information by transmitting and receiving a predetermined signal with the second unit device 324. The ranging may include measuring a distance between the electronic device 310 and the external device 320. For example, the ranging-related algorithm may include at least one of time of flight (ToF), one way ranging (OWR), two way ranging (TWR), double side-TWR (DS-TWR), single side-TWR (SS-TWR), time difference of arrival (TDoA), or angle of arrival (AoA). For example, in the one way ranging, the external device 320 may determine a distance to the electronic device 310 by measuring an arrival time when the electronic device 310 transmits time information to the external device 320. The TWR may remove time errors by sharing time information while signals are exchanged between the electronic device 310 and the external device 320 several times, and may measure a distance. The TWR may include SS-TWR and DS-TWR.

The first unit device 322 and the second unit device 324 may also obtain the third distance information by transmitting and receiving a predetermined signal through the ranging-related algorithm. The processor 315 may receive the third distance information from the first unit device 322 and/or the second unit device 324 and may use the third distance information to determine the location of the electronic device 310. For example, the processor 315 may determine a direction and a distance between the electronic device 310 and the external device 320 based on the first distance information, the second distance information, and the third distance information. As such, the processor 315 may identify an extent, to which the electronic device 310 is spaced from a first axis line (e.g., 402 in FIG. 4A) with respect to a specified portion (e.g., a heart) of the body, and an extent to which the electronic device 310 is spaced from a second axis line (e.g., 404 in FIG. 4A) with respect to a specified portion (e.g., a heart) of the body. In this regard, the processor 315 may receive a body profile (e.g., a height, a weight, a gender, an age, or the like) from the user to determine a specified portion of the body that is to become a reference. The location of the electronic device 310 may be used to predict an extent to which the user's arms are spaced from a torso and/or heights of the user's arms.

As described above, when a signal is transmitted or received through the ranging-related algorithm, the third distance information, which has an error because the transmitted and received signal is distorted by at least part of the body positioned between the first unit device 322 and the second unit device 324, may be obtained. As a result, the location of the electronic device 310 may also be measured inaccurately. In this regard, as will be described later, the processor 315 may improve the accuracy associated with determining the location of the electronic device 310 using the predetermined third distance information.

For example, the third distance information may be predetermined based on a body measurement index (e.g., a distance between both ears). For example, an average value of body measurements pre-measured from a measurement target determined in consideration of an age, a gender, or a height may be used as the third distance information. In this regard, the processor 315 may determine the location of the electronic device 310 using the third distance information stored inside the electronic device 310 or the third distance information provided from the second unit device 322 and/or the third unit device 324. For example, the processor 315 may determine a direction and a distance between the electronic device 310 and the external device 320 based on the first distance information, the second distance information, and the third distance information.

According to an embodiment, the processor 315 may determine the posture of the electronic device 310 based on information detected through the sensor module 311. The posture of the electronic device 310 may include information about rotation (or tilt) and direction information. For example, the processor 315 may use data including the digitized change in feature information detected through the sensor module 311 (e.g., the first sensor module 311-1) depending on the posture of the electronic device 310. For example, the digitized change in feature information detected through the sensor module 311 depending on the posture of the electronic device 310 may include location change amount and/or direction change amount information of the electronic device 310. In this regard, the processor 315 may determine the posture of the electronic device 310 by comparing the information detected through the sensor module 311 with the stored data. As such, the processor 315 may determine the posture of the electronic device 310 with respect to the first axis line (e.g., 402 of FIG. 4A) or may determine the posture of the electronic device 310 with respect to the second axis line (e.g., 404 of FIG. 4A). The posture of the electronic device 310 may be used to predict an extent to which the user's arms are bent, an angle between arms, or directions of the user's arms.

According to various embodiments, when measuring biometric information, the processor 315 may output guide information for guiding the measurement posture of the user to correspond to the reference posture. To obtain biometric information having accuracy of a specific level or higher, the reference posture may be a posture that needs to be taken by the electronic device 310 (or a user) when biometric information is measured. The reference posture may be different depending on the type of biometric information to be measured.

According to an embodiment, in the case where body composition is measured based on a BIA signal, only when a posture is taken such that the user's armpits are sufficiently wide and crooks of the user's arms do not stick to each other, a high-accuracy measurement result may be obtained. As such, the processor 315 may provide guide information using the above-described posture as a reference posture corresponding to the measurement of body composition.

According to an embodiment, in the case where oxygen saturation is measured, only when a posture is taken such that the electronic device 310 is positioned in the middle of the user's chest at the height of the user's heart, a high-accuracy measurement result may be obtained. As such, the processor 315 may provide guide information using the above-described posture as a reference posture corresponding to the measurement of oxygen saturation.

According to an embodiment, the electronic device 310 may measure blood pressure using the information measured by a cuff-type blood pressure gauge as a correction value. In this regard, in the case where blood pressure is measured, only when the same posture as a posture in which blood pressure was measured using a cuff-type blood pressure gauge is maintained, a high-accuracy measurement result may be obtained. As such, the processor 315 may provide guide information using the above-described posture as a reference posture corresponding to the measurement of blood pressure.

According to an embodiment, as will be described in greater detail below, the processor 315 may output guide information.

For example, the processor 315 may provide a reference posture in response to detecting a biometric information measurement event. In this regard, the processor 315 may obtain a reference posture corresponding to the biometric information to be measured. For example, as shown in FIG. 4B, the processor 315 may provide reference posture information 412 expressing the reference posture as visual information (410). However, this is only an example, and various embodiments of disclosure are not limited thereto. The reference posture information may be provided as auditory information. Together with the reference posture information 412, the processor 315 may provide additional information (e.g., please take a measurement posture) 414 instructing taking a measurement posture corresponding to the reference posture.

For example, after providing the reference posture information 412, the processor 315 may continuously monitor a user-related measurement posture. As shown in FIG. 4C, the processor 315 may provide guide information (e.g., please raise your arm more) 424 for guiding the monitored measurement posture so as to correspond to the reference posture (420). In this regard, the processor 315 may output measurement posture information 422, which expresses the measurement posture thus monitored as visual information, together with the reference posture information 412. As such, the user may recognize whether the measurement posture corresponds to the reference posture, based on an extent to which the reference posture information 412 matches the measurement posture information 422, and may also change the measurement posture so as to correspond to the reference posture (or such that the reference posture information 412 matches the measurement posture information 422).

According to various embodiments, the processor 315 may measure biometric information after providing guide information. The biometric information may be measured when the user's measurement posture corresponds to the reference posture. According to an embodiment, when the measurement posture corresponds to the reference posture, the processor 315 may determine that the user is taking an appropriate posture for measuring biometric information, and then may control an operation (e.g., an operation of a biometric sensor) of the electronic device 310 associated with measurement of biometric information. For example, when a measurement posture corresponding to the reference posture is maintained during a specified time (e.g., 2 seconds), or when it is determined that the movement of the electronic device 310 (or the user) is less than a specified level (e.g., a movement suitable to measure biometric information) while the measurement posture corresponding to the reference posture is maintained during the specified time, the processor 315 may control an operation of the electronic device 310 associated with the measurement of biometric information. In this regard, as shown in FIG. 4D, the processor 315 may provide a graphic effect 432 indicating that the measurement posture information corresponds to the reference posture information 412 (430). The processor 315 may measure biometric information after outputting a notification (e.g., start measuring biometric information) 434 indicating that biometric information is actually measured.

According to various embodiments, the memory 317 may store a command or data associated with at least another component of the electronic device 310. According to an embodiment, the memory 317 may include a program, an algorithm, a routine, and/or an instruction associated with measuring biometric information. The memory 317 may include at least one program module indicating each operation of the processor 315 described in various embodiments of this disclosure. The program module may include the program 140 of FIG. 1. According to an embodiment, in measuring biometric information, the memory 317 may include a command for providing guide information such that the measurement posture of the user corresponds to the reference posture.

According to various embodiments, as described above, the external device 320 may include a first unit device (e.g., a first electronic device such as a right earphone) 322 and a second unit device (e.g., a second electronic device such as a left earphone) 324. According to an embodiment, the first unit device 322 and the second unit device 324 may operate independently of each other. In this regard, as shown in (i) of FIG. 3B, each of the first unit device 322 and the second unit device 324 may establish communication with the electronic device 310 to transmit and receive signals (e.g., commands or data). According to an embodiment, one of the first unit device 322 and the second unit device 324 (e.g., the first unit device 322) may operate as a master device controlling overall operations of the external device 320, and the other may operate as a slave device under the control of the master device. In this regard, as shown in (ii) of FIG. 3B, the master device (e.g., the first unit device 322) may establish communication with the electronic device 310 and the slave device (e.g., the second unit device 324). As such, the master device (e.g., the first unit device 322) may transmit a signal received from the electronic device 310 to the slave device (e.g., the second unit device 324) and may transmit a signal received from the slave device (e.g., the second unit device 324) to the electronic device 310. For example, the master device (e.g., the first unit device 322) may perform first communication (e.g., UWB-based communication) with the electronic device 310 and may perform second communication (e.g., BLE-based communication) with the slave device (e.g., the second unit device 324).

According to an embodiment, the first unit device 322 may include a first unit communication module (e.g., including communication circuitry) 322-1 and a first unit processor (e.g., including processing circuitry) 322-3. Configurations of the first unit device 322 described above is an example, and various embodiments of the disclosure are not limited thereto. For example, the first unit device 322 may be implemented to further include configurations not illustrated in FIG. 3A.

Similarly, the second unit device 324 may include a second unit communication module (e.g., including communication circuitry) 324-1 and a second unit processor (e.g., including processing circuitry) 324-3. The configuration of the second unit device 324 may be similar to or the same as that of the first unit device 322. Accordingly, the description associated with the configuration of the first unit device 322 to be described in greater detail below may be identically or similarly applied to a configuration of the second unit device 324. Detailed descriptions of the configuration of the second unit device 324 may be omitted to avoid redundancy.

The first unit communication module 322-1 may include various communication circuitry and support wireless communication with the electronic device 310 and the second unit communication module 324-1. According to various embodiments, the first unit communication module 322-1 may be a device including hardware and software for transmitting and receiving a signal (e.g., commands or data) between the first unit device 322 and the electronic device 310 and between the first unit device 322 and the second unit device 324. For example, the first unit communication module 322-1 may include a communication module for supporting UWB communication. However, this is only an example, and various embodiments of this disclosure are not limited thereto. For example, the first unit communication module 322-1 may include an infrared data association (IrDA) communication module, a wireless fidelity (Wi-Fi) communication module, a Wi-Fi Direct communication module, or Bluetooth communication module.

The first unit processor 322-3 may be operatively connected to the first unit communication module 322-1 and may include various processing circuitry to control the first unit communication module 322-1.

According to various embodiments, the first unit processor 322-3 may process to transmit and receive a predetermined signal with the electronic device 310 through the ranging-related algorithm. For example, the first unit processor 322-3 may transmit and receive a predetermined signal with the electronic device 310 based on UWB communication such that a first distance between the first unit device 322 and the electronic device 310 is obtained.

According to various embodiments, the first unit processor 322-3 may obtain third distance information between the first unit device 322 and the second unit device 324 based on the signal transmitted and received with the second unit device 324 (or the second unit communication module 324-1) through the first unit communication module 322-1. According to an embodiment, through the ranging-related algorithm, the first unit processor 322-3 may obtain the third distance information by transmitting and receiving a predetermined signal with the second unit device 324. In this regard, the first unit processor 322-3 may provide the obtained third distance information to the electronic device 310. As such, the electronic device 310 may use the third distance information to determine the location of the electronic device 310.

According to an embodiment, the first unit processor 322-3 may obtain the third distance information predetermined based on a body measurement index (e.g., a distance between both ears). For example, an average value of body measurements pre-measured from a measurement target determined in consideration of an age, a gender, or a height may be used as the third distance information. In this regard, the first unit processor 322-3 may provide the third distance information stored in the first unit device 322 to the electronic device 310. However, this is only an example, and various embodiments of the disclosure are not limited thereto. For example, when the first unit device 322 operates as a master device and the third distance information is stored in the second unit device 324 operating as a slave device, the first unit processor 322-3 may receive the third distance information from the second unit device 324 and may provide the third distance information to the electronic device 310.

According to various example embodiments, an electronic device (e.g., the electronic device 310) may include: an output module comprising output circuitry (e.g., the output module 313), a communication module comprising communication circuitry (e.g., the communication module 319) configured to communicate with at least one external device (e.g., the first unit device 322 and the second unit device 324), a first sensor (e.g., the second sensor module 311-3) configured to sense a biometric signal for a body, a second sensor (e.g., the first sensor module 311-1) configured to sense an inertial signal, and a processor (e.g., the processor 315) operatively connected to the output module, the communication module, the first sensor, and the second sensor. The processor may be configured to: determine a location of the electronic device for a body based on a signal transmitted or received with the at least one external device through the communication module in response to sensing the biometric signal through the first sensor, determine a posture of the electronic device based on information obtained through the second sensor, determine a measurement posture (e.g., a measurement posture of a user) based on the location of the electronic device and the posture of the electronic device, and provide a guide to correspond the measurement posture to a predetermined reference posture.

According to various example embodiments, based on the measurement posture corresponding to the predetermined reference posture, the processor may be configured to measure biometric information based on the biometric signal sensed through the first sensor.

According to various example embodiments, the processor is configured to monitor the measurement posture while providing the guide information and to output information indicating the monitored measurement posture and information indicating the reference posture through the output module.

According to various example embodiments, the electronic device may further include at least one electrode (e.g., the first electrode 203, the second electrode 204) connected to the first sensor. The processor may be configured to measure biometric information about a portion of the body contacting the at least one electrode.

According to various example embodiments, the electronic device may further include a fingerprint sensor configured to sense fingerprint information and positioned such that the one portion of the body is in contact based on the one portion of the body contacting the at least one electrode. The processor may be configured to determine the measurement posture based on information obtained through the fingerprint sensor.

According to various example embodiments, the processor may be configured to compare the biometric information with previously-measured biometric information, to determine whether an error factor occurs based on the comparison, and to provide a notification of the determination result.

According to various example embodiments, the processor may be configured to obtain the measurement pattern and to provide a notification of the measurement pattern before determining the measurement posture.

According to various example embodiments, the guide information may include at least one of visual information, auditory information, or tactile information.

According to various example embodiments, the communication module includes an ultra-wide band (UWB) communication module.

According to various example embodiments, a biometric information measuring system may include: an electronic device (e.g., the electronic device 310) including a first sensor (e.g., the second sensor module 311-3) configured to obtain a biometric signal, a second sensor (e.g., the first sensor module 311-1) configured to sense an inertial signal, and a communication module comprising communication circuitry (e.g., the communication module 319) wherein the electronic device is configured to be worn on a first portion of a body, a first external device (e.g., the first unit device 322) configured to communicate with the electronic device wherein the first external device is configured to be worn on a second portion different from the first portion of the body, and a second external device (e.g., the second unit device 324) configured to communicate with the electronic device wherein the second external device is configured to be worn on a third portion different from the second portion of the body. According to an example embodiment, the electronic device may be configured to determine a posture of the electronic device based on information obtained through the second sensor, to determine a location of the electronic device based on a signal transmitted and received with the first external device and the second external device, to determine a measurement posture (e.g., a measurement posture of a user) based on the location of the electronic device and the posture of the electronic device, to guide the measurement posture to correspond to a predetermined reference posture, and to measure biometric information based on a biometric signal obtained through the first sensor based on the measurement posture corresponding to a predetermined reference posture.

According to various example embodiments, the communication module may include a UWB communication module.

Figure 5A:
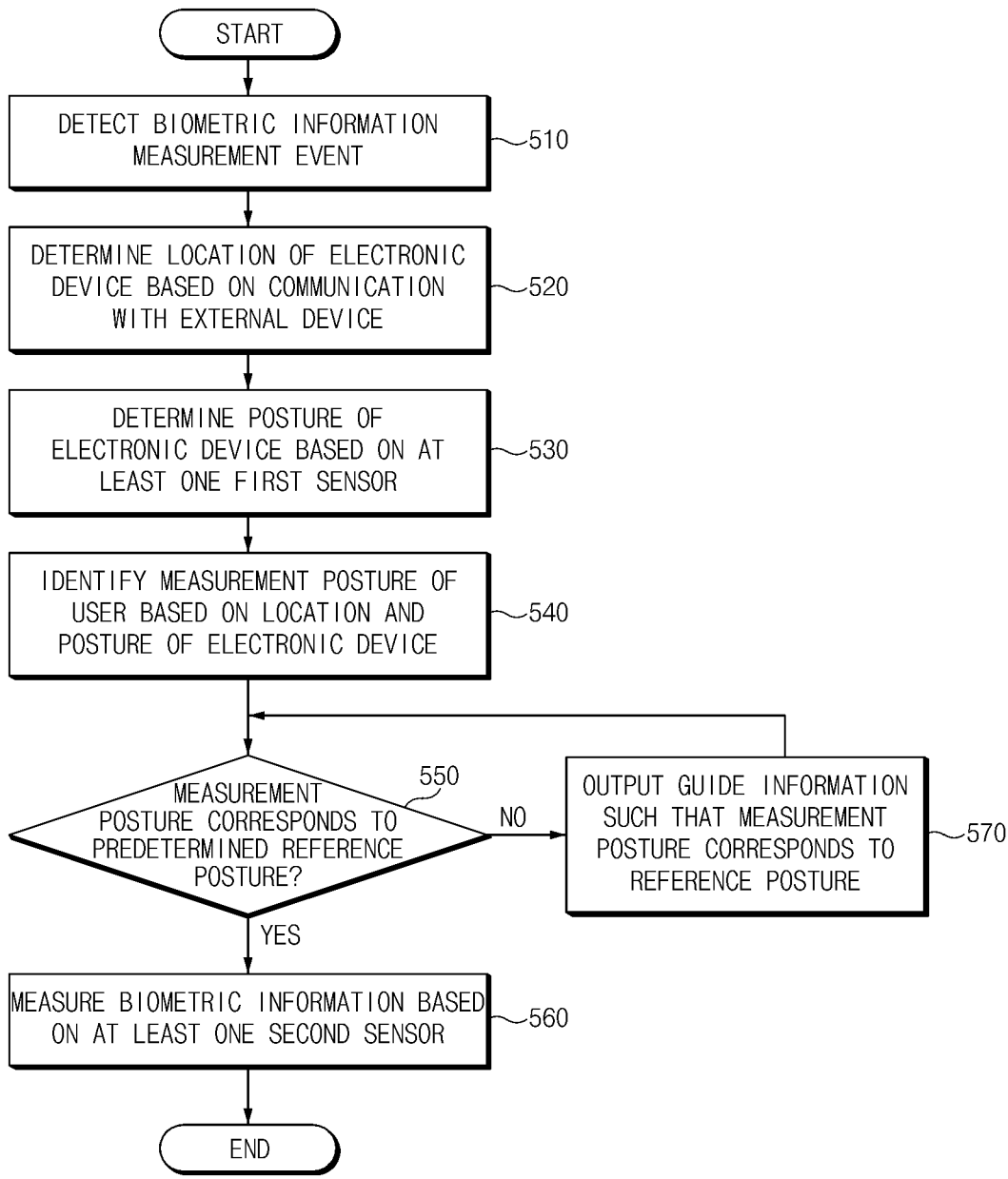
FIG. 5A is a flowchart illustrating an example operation of measuring biometric information of an electronic device, according to various embodiments.
Figure 5C:
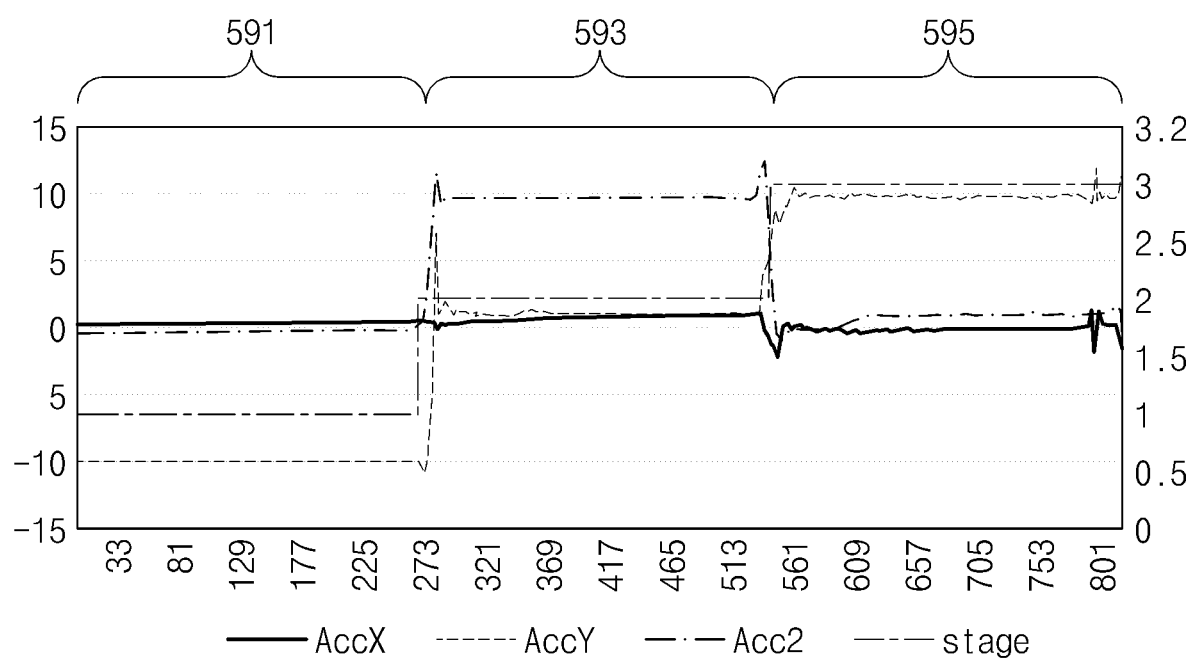
FIG. 5C is a graph illustrating an example posture of an electronic device, according to various embodiments.

FIG. 5A is a flowchart illustrating an example operation of measuring biometric information of an electronic device, according to various embodiments. FIG. 5B is a diagram illustrating an example location of an electronic device, according to various embodiments. FIG. 5C is a graph illustrating a posture of an electronic device, according to various embodiments. Hereinafter, each operation in the following embodiments may be sequentially performed, but is not necessarily sequentially performed. For example, the order of operations may be changed, and at least two operations may be performed in parallel. Also, at least one of the above-described operations may be omitted according to an embodiment.

Referring to FIG. 5A, in operation 510, the electronic device 310 (or the processor 315) according to various embodiments may detect a biometric information measurement event. According to an embodiment, the electronic device 310 may detect an input to a menu indicating measurement of biometric information.

According to various embodiments, in operation 520, the electronic device 310 (or the processor 315) may determine a location of the electronic device 310 based on communication with the at least one external device 320. According to an embodiment, as will be described in greater detail below with reference to FIGS. 6 and 7, the electronic device 310 may determine the location of the electronic device 310 by transmitting and receiving a predetermined signal with the at least one external device 310 based on UWB communication. In this regard, the electronic device 310 may transmit/receive a predetermined signal with the at least one external device 320 through a ranging-related algorithm. For example, the ranging-related algorithm may include at least one of ToF, TWR, DS-TWR, SS-TWR, TDoA, or AoA.

For example, as shown in FIG. 5B, an electronic device 585 may transmit and receive a predetermined signal based on UWB communication with a first external device 581 and a second external device 583. As such, the electronic device 585 may identify a first distance (A) to the first external device 581, a second distance (B) to the second external device 583, and a third distance (C) between the first external device 581 and the second external device 583. According to an embodiment, as described above, the electronic device 585 may obtain the third distance information predetermined based on a body measurement index (e.g., a distance between both ears). In this regard, the electronic device 585 may obtain the third distance information stored in the inside (e.g., a memory) of the electronic device 585 or may obtain the third distance information from the first external device 581 or the second external device 583.

The electronic device 585 may determine a location of the electronic device 585 inclined in a first direction (e.g., right) with respect to a user's body center (e.g., (i) of FIG. 5B), a location of the electronic device 585 inclined in a second direction (e.g., left) with respect to the user's body center (e.g., (ii) of FIG. 5B), or a location of the electronic device 585 corresponding to the user's body center (e.g., (iii) in FIG. 5B), based on the first distance (A), the second distance (B), and the third distance (C). However, this is only an example, and various embodiments of this disclosure are not limited thereto. For example, as described above, the electronic device 585 may also determine the height of the electronic device based on the first distance (A), the second distance (B), and the third distance (C).

According to various embodiments, in operation 530, the electronic device 310 (or the processor 315) may determine a posture of the electronic device 310 based on at least one first sensor (e.g., the first sensor module 311-1). The posture of the electronic device 310 may include information about rotation (or tilt) and direction information. According to an embodiment, the first sensor may include at least one of an acceleration sensor, a gyro sensor, a gesture sensor, and a barometric pressure sensor.

According to an embodiment, in determining the posture of the electronic device 310, the electronic device 310 may use the feature of information sensed through the first sensor. For example, FIG. 5C is a graph illustrating example features of information 591 sensed through the first sensor in a state where the electronic device 310 maintains a first posture, information 593 sensed through the first sensor in a state where the electronic device 310 maintains a second posture, and information 595 sensed through the first sensor in a state where the electronic device 310 maintains a third posture.

According to an embodiment, the first posture may be a posture in which a first surface (e.g., front) of the electronic device 310 faces a first direction (e.g., a direction of a second axis line (e.g., 404 in FIG. 4A)). The second posture may be a posture in which the first surface of the electronic device 310 faces a second direction (e.g., a direction of a first axis line (e.g., 402 in FIG. 4A)) perpendicular to the first direction. In addition, the third posture may be a posture in which the first surface of the electronic device 310 faces a third direction opposite to the first direction.

According to an embodiment, the above-mentioned first to third postures may be postures in a state where the first surface of the electronic device 310 on which the display (e.g., the display 201 in FIG. 2) is disposed and a surface (e.g., the second surface) on which the sensor module 311 is disposed are arranged substantially horizontally with respect to the second axis line (e.g., 404 in FIG. 4A).

According to an embodiment, determining the posture of the electronic device 310 based on at least one first sensor (e.g., the first sensor module 311-1) may be determining the posture of the second sensor based on at least one first sensor.

According to an embodiment, the electronic device 310 may determine a posture of the second sensor based on a relative placement location (or direction) of the second sensor with respect to a placement location (or direction) of at least one first sensor within housing (e.g., the housing 206 in FIG. 2).

For example, when at least one first sensor is inclined with respect to the second sensor by about 45 degrees, the posture of the second sensor may be calculated based on the axis changed by about 45 degrees.

According to an embodiment, the relative placement location information of the second sensor with respect to at least one first sensor may be stored in the memory 317 and may be utilized by the processor 315.

According to an embodiment, the above-described first to third postures are described assuming that locations of the first sensor and the second sensor in the housing 206 of the electronic device 310 are fixed, but may not be limited thereto. For example, as a form factor of the electronic device 310 is changed, the relative location of the second sensor with respect to the location of the first sensor may be changed.

For example, the electronic device 310 may determine the posture of the electronic device 310 by comparing the information sensed through the first sensor with the pre-stored data that is digitized depending on the posture of the electronic device 310.

According to various embodiments, in operation 540, the electronic device 310 (or the processor 315) may identify the measurement posture of the user based on a location of the electronic device 310 and a posture of the electronic device 310. The measurement posture may be a posture taken by the user to measure the biometric information. According to an embodiment, the electronic device 310 may identify a measurement posture including at least one of an extent to which the user's arms are bent, an extent to which the user's arms are spaced from a torso, heights of the user's arms, an angle between the user's arms, or directions of the user's arms.

According to various embodiments, in operation 550, the electronic device 310 (or the processor 315) may determine whether the measurement posture corresponds to a predetermined reference posture. To obtain biometric information having accuracy of a specific level or higher, the reference posture may be a posture that needs to be taken by the electronic device 310 (or a user) when biometric information is measured. According to an embodiment, the electronic device 310 may store each reference posture corresponding to measurable biometric information.

According to various embodiments, when the measurement posture corresponds to a predetermined reference posture, in operation 560, the electronic device 310 (or the processor 315) may obtain biometric information based on at least one second sensor (e.g., the second sensor module 311-3). According to an embodiment, the second sensor may include a biometric sensor.

According to various embodiments, when the measurement posture does not correspond to the predetermined reference posture, in operation 570, the electronic device 310 (or the processor 315) may output guide information such that the measurement posture corresponds to the reference posture. According to an embodiment, the electronic device 310 may provide reference posture information (e.g., 412 in FIG. 4B) expressing the reference posture as visual information. The electronic device 310 may provide guide information (e.g., 424 in FIG. 4C) for guiding the measurement posture so as to correspond to the reference posture while the electronic device 310 continuously monitors the user's measurement posture. In this regard, the electronic device 310 may induce the user to change a measurement posture so as to correspond to the reference posture by providing measurement posture information expressing the monitored measurement posture as visual information together with the reference posture information.

Figure 6:
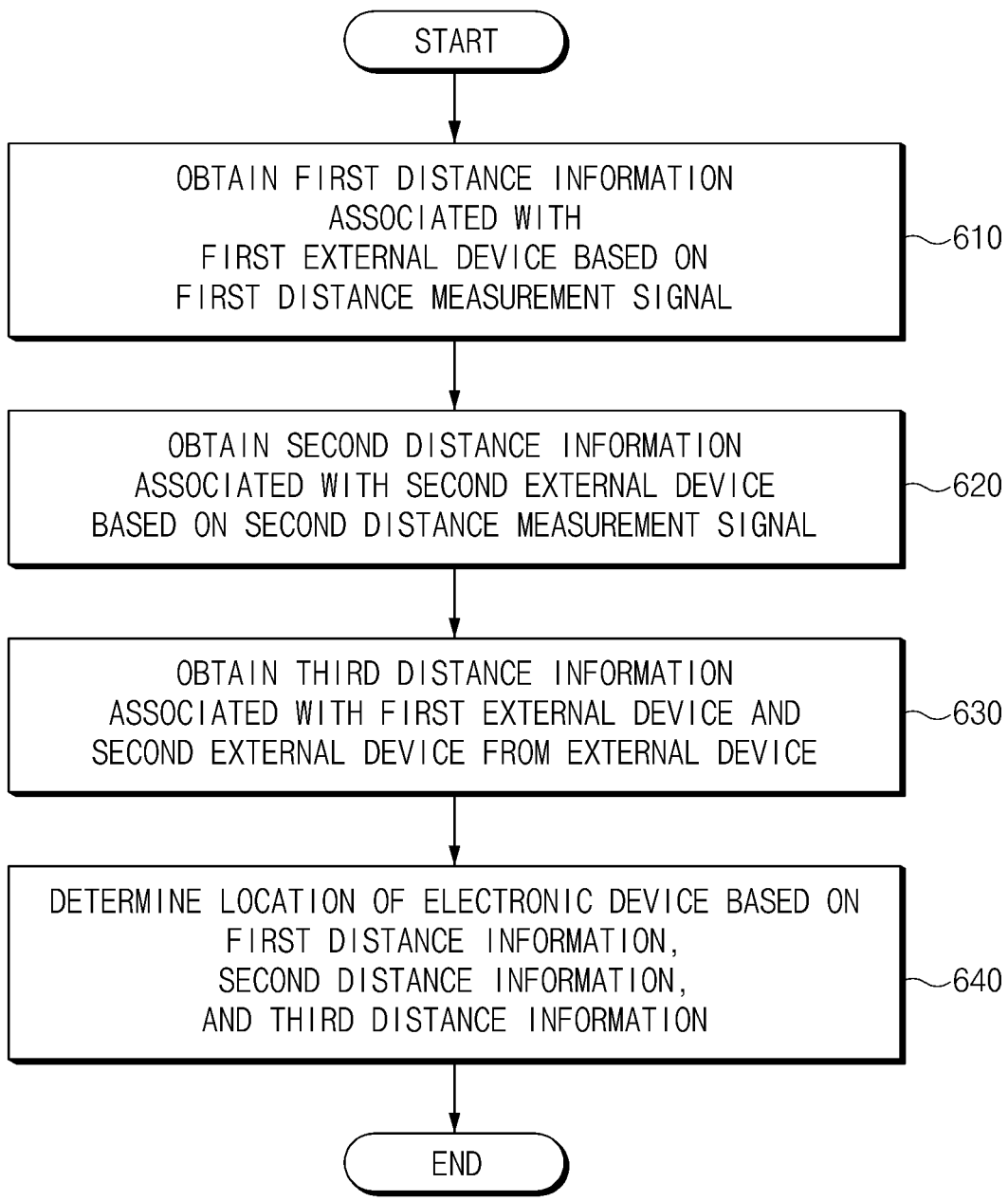
FIG. 6 is a flowchart illustrating an example operation of determining a location of an electronic device in an electronic device, according to various embodiments.

FIG. 6 is a flowchart illustrating an example operation of determining a location of an electronic device in an electronic device, according to various embodiments. Operations of FIG. 6 described below may indicate various embodiments of operation 520 of FIG. 5A.

Referring to FIG. 6, in operation 610, the electronic device 310 (or the processor 315) according to various embodiments may obtain first distance information associated with a first external device (e.g., the first unit device 322) based on a first distance measurement signal. According to an embodiment, the electronic device 310 may transmit and receive the first distance measurement signal with the first external device based on UWB communication. The first distance measurement signal may be a predetermined signal transmitted and received with the first external device for distance measurement. For example, the electronic device 310 may transmit the first distance measurement signal to the first external device and may obtain the first distance information based on a time at which a response signal to the first distance measurement signal is received. The first distance information may be obtained through a variety of known technologies, and detailed descriptions thereof will be omitted to avoid redundancy.

According to various embodiments, in operation 620, the electronic device 310 (or the processor 315) may obtain second distance information associated with a second external device (e.g., the second unit device 324) based on a second distance measurement signal. According to an embodiment, the electronic device 310 may transmit and receive the second distance measurement signal with the second external device based on UWB communication. The second distance measurement signal may be a predetermined signal transmitted and received with the second external device for distance measurement. For example, the electronic device 310 may transmit the second distance measurement signal to the second external device and may obtain the second distance information based on a time at which a response signal to the second distance measurement signal is received.

According to various embodiments, in operation 630, the electronic device 310 (or the processor 315) may obtain third distance information associated with the first external device and the second external device from the external device. The third distance information may be distance information obtained by the first external device and/or the second external device.

According to various embodiments, in operation 640, the electronic device 310 (or the processor 315) may determine a location of the electronic device 310 based on the first distance information, the second distance information, and the third distance information.

Figure 7:
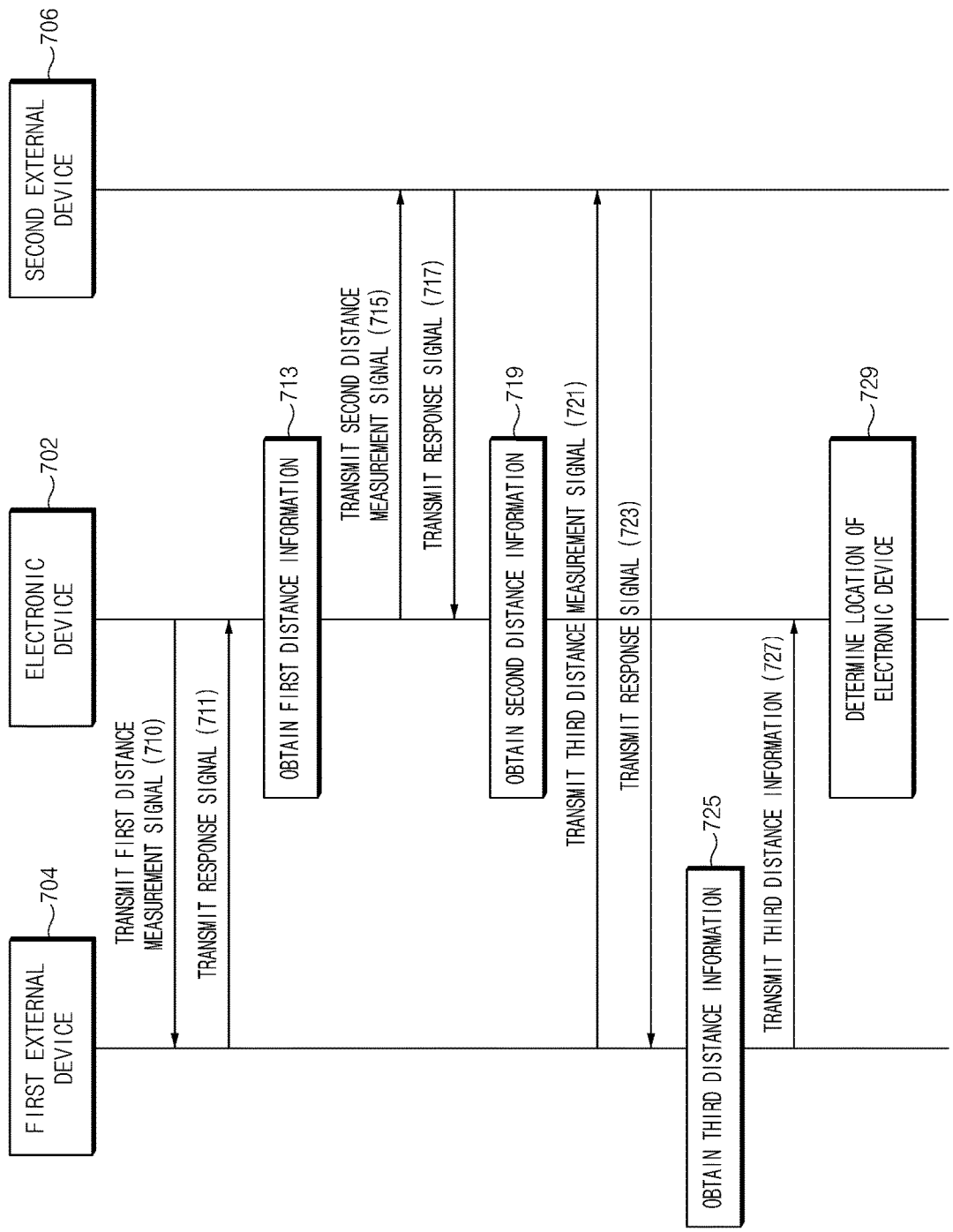
FIG. 7 is a signal flow diagram illustrating an example operation of determining a location of an electronic device in a biometric information measuring system, according to various embodiments.

FIG. 7 is a signal flow diagram illustrating an example operation of determining a location of an electronic device in a biometric information measuring system, according to various embodiments.

Referring to FIG. 7, a biometric information system according to various embodiments may include an electronic device 702, a first external device 704, and a second external device 706. The electronic device 702 may be the electronic device 310 described above with reference to FIG. 3A. The first external device 704 and the second external device 706 may be the first unit device 322 and the second unit device 324, respectively.

According to various embodiments, the electronic device 702 may obtain first distance information through operations 710, 711 and 713. According to an embodiment, in operation 710, the electronic device 702 may transmit a first distance measurement signal to the first external device 704. For example, the first distance measurement signal may include a ranging initiation message. The electronic device 702 may store the transmission time of the first distance measurement signal and may transmit the first distance measurement signal to the first external device 704.

In operation 711, the first external device 704 may transmit a response signal to the first distance measurement signal to the electronic device 702. According to an embodiment, in response to receiving the first distance measurement signal, the first external device 704 may store a time when the first distance measurement signal is received. The first external device 704 may transmit the response signal to the first distance measurement signal to the electronic device 702.

For example, the response signal may include a ranging response message to the received first distance measurement signal. The first external device 704 may store a time when the response signal is transmitted. As such, in operation 713, the electronic device 702 may obtain first distance information based on a time associated with the transmission of the first distance measurement signal and a time associated with the reception of the response signal. According to an embodiment, in response to receiving the response signal, the electronic device 702 may store the reception time of the response signal. The electronic device 702 may identify a time associated with transmission of the first distance measurement signal and a time associated with reception of a response signal based on the first distance measurement signal and response signal, which are transmitted and received with the first external device 704. The electronic device 702 may obtain first distance information based on a time associated with transmission of the first distance measurement signal and a time associated with reception of a response signal.

According to various embodiments, the electronic device 702 may obtain second distance information through operations 715, 717 and 719. According to an embodiment, in operation 715, the electronic device 702 may transmit a second distance measurement signal to the second external device 706. In operation 717, the second external device 706 may transmit a response signal to the second distance measurement signal to the electronic device 702. In operation 719, the electronic device 702 may obtain second distance information based on a time associated with transmission of the second distance measurement signal and a time associated with reception of the response signal. For example, a time associated with the transmission of the second distance measurement signal and a time associated with the reception of the response signal may be identified in the manner identical or similar to that in operation 710 to operation 713 described above.

According to various embodiments, the first external device 704 may obtain third distance information through operations 721, 723 and 725. According to an embodiment, in operation 721, the first external device 704 may transmit a third distance measurement signal to the second external device 706. Furthermore, in operation 723, the second external device 706 may transmit a response signal to the third distance measurement signal to the first external device 704. In operation 725, the first external device 704 may obtain third distance information based on a time associated with transmission of the third distance measurement signal and a time associated with reception of the response signal. For example, a time associated with the transmission of the third distance measurement signal and a time associated with the reception of the response signal may be identified in the manner identical or similar to that in operations 710, 711 and 713 described above. However, this is only an example, and various embodiments of this disclosure are not limited thereto. For example, the third distance information may be obtained by the second external device 706. The third distance information may be obtained by the first external device 704 and the second external device 706.

According to various embodiments, in operation 727, the first external device 704 may transmit the third distance information to the electronic device 702. In operation 729, the electronic device 702 may determine a location of the electronic device 702 based on the first distance information, the second distance information, and the third distance information. For example, the electronic device 702 may determine the location and direction of the electronic device 702 using triangulation.

Figure 8A:
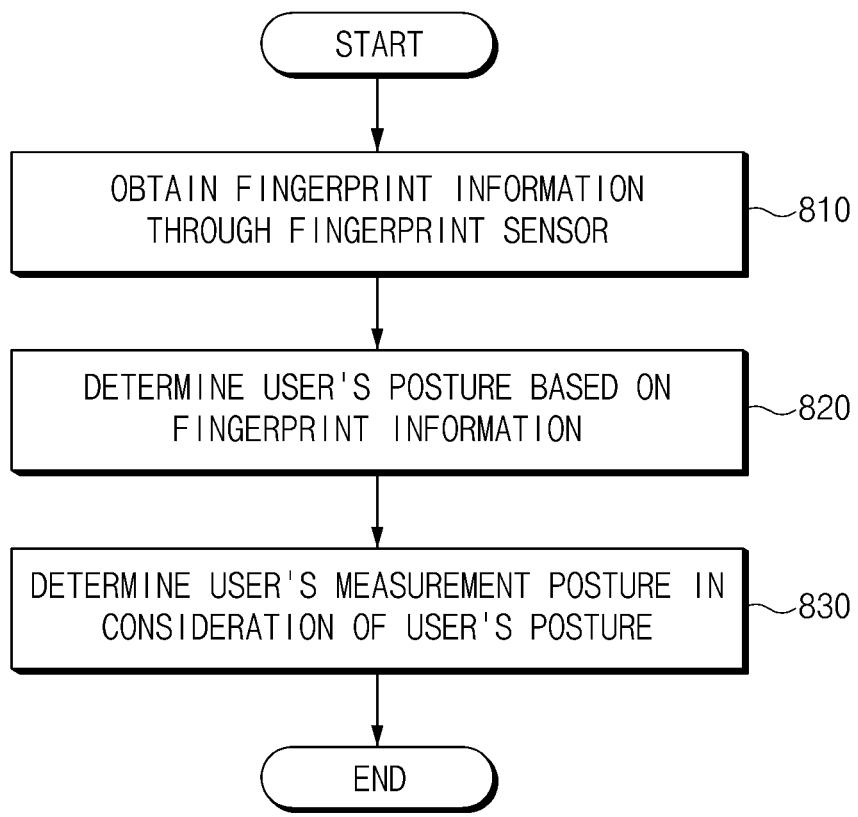
FIG. 8A is a flowchart illustrating an example operation of determining a measurement posture in an electronic device, according to various embodiments.

FIG. 8A is a flowchart illustrating an example operation of determining a measurement posture in an electronic device, according to various embodiments. FIG. 8B is a diagram illustrating a user's measurement posture determined by fingerprint information, according to various embodiments. Operations of FIG. 8A described below may indicate various embodiments of operation 540 of FIG. 5A.

Referring to FIG. 8A, in operation 810, the electronic device 310 (or the processor 315) according to various embodiments may obtain fingerprint information through a fingerprint sensor. According to an embodiment, the fingerprint sensor may be exposed through the housing 206 shown in FIG. 2. For example, the fingerprint sensor may be disposed to overlap the first electrode 203 exposed through a third surface of the housing 206. However, this is only an example, and various embodiments of this disclosure are not limited thereto.

According to various embodiments, in operation 820, the electronic device 310 (or the processor 315) may determine a user's measurement posture based on the fingerprint information. According to an embodiment, the electronic device 310 may determine an angle and/or height of the user's arm by analyzing the fingerprint image obtained through the fingerprint sensor. The angle and/or height of the user's arm may vary depending on the angle of a finger contacting the fingerprint sensor and the type of a finger. For example, the height of the arm in the case where the angle of the finger with respect to the fingerprint sensor is within a first angle range as shown in (i) of FIG. 8B may be lower than the height of the arm in the case where the angle of the finger with respect to the fingerprint sensor is within a second angle range greater than the first angle range as shown in (ii) of FIG. 8B. As such, the electronic device 310 may determine the angle of the finger by comparing a fingerprint image with the pre-stored reference image and then may determine the angle and/or height of the user's arm based on the angle of a finger. In this regard, when storing (or registering) the reference image, the electronic device 310 may also store information associated with the angle of a finger corresponding to the reference image, an angle of an arm, and/or a height of the arm. Moreover, the electronic device 310 may determine the type of a finger (e.g., an index finger), which is in contact with the fingerprint sensor, by comparing the fingerprint image with the pre-stored reference image, and then may determine the angle and/or height of the user's arm based on the determined type of the finger.

According to various embodiments, in operation 830, the electronic device 310 (or the processor 315) may determine the user's measurement posture in consideration of the user's posture based on measurement posture fingerprint information.

Figure 9:
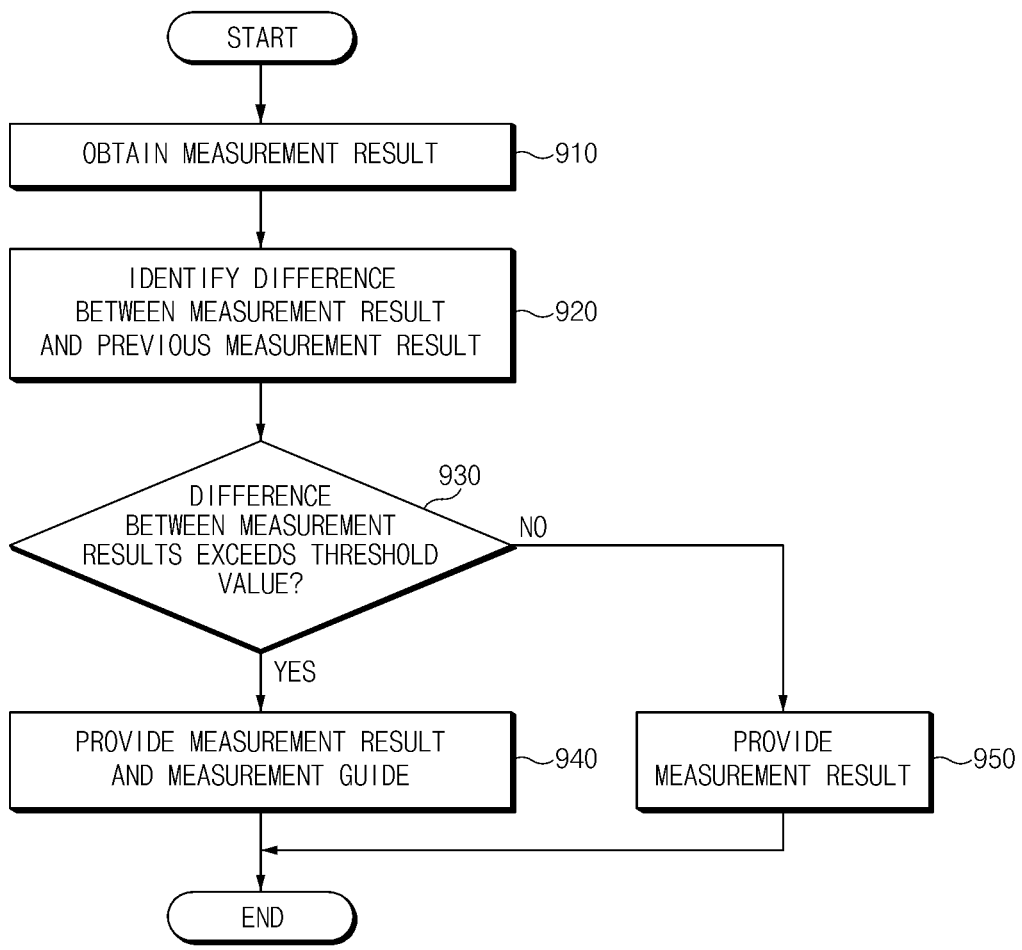
FIG. 9 is a flowchart illustrating an example operation of measuring biometric information in an electronic device, according to various embodiments.
Figure 10:
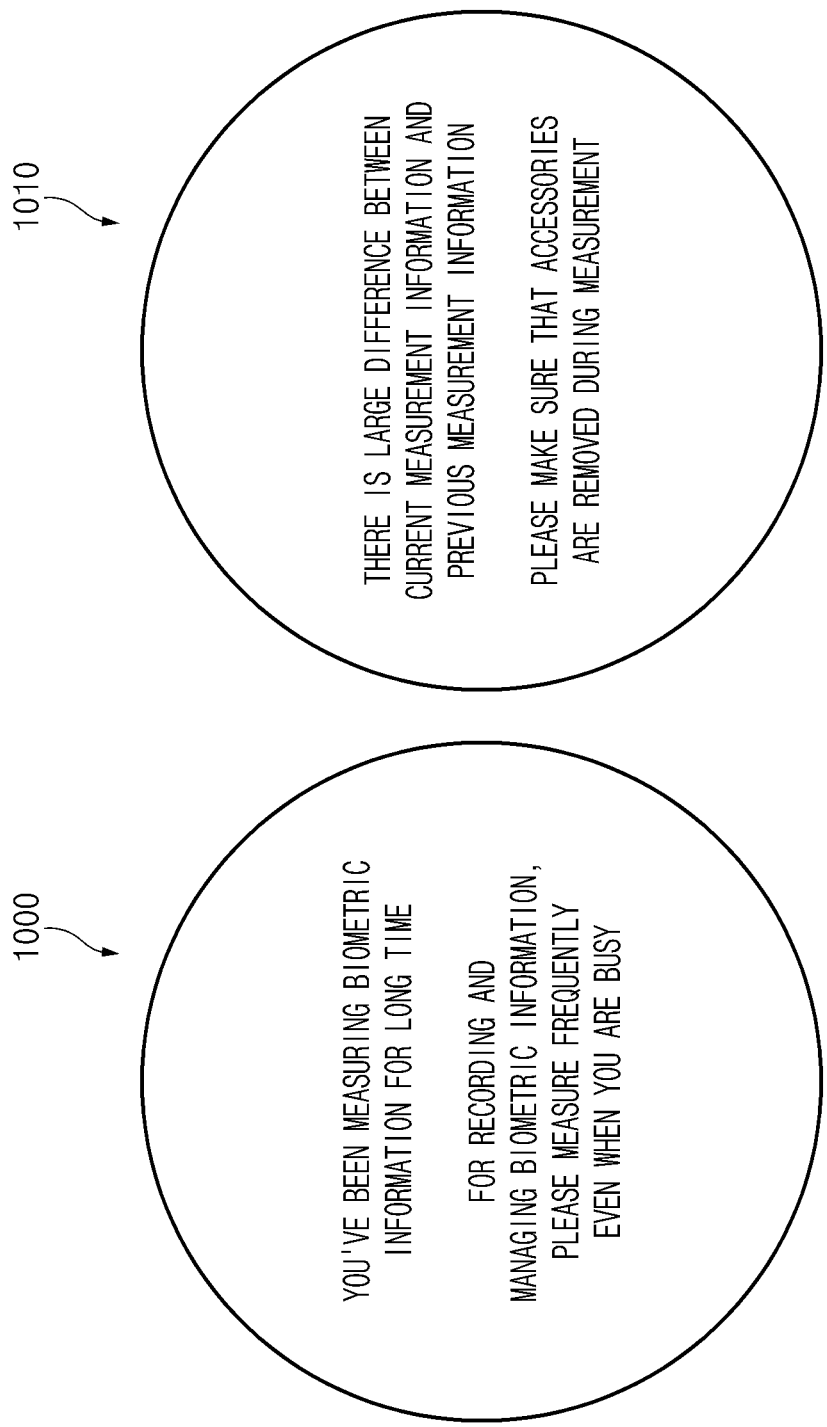
FIG. 10 is a diagram illustrating an example operation of providing a measurement result in an electronic device, according to various embodiments.

FIG. 9 is a flowchart illustrating an example operation of measuring biometric information in an electronic device, according to various embodiments. FIG. 10 is a diagram illustrating an example operation of providing a measurement result in an electronic device, according to various embodiments. Operations of FIG. 9 described below may indicate various embodiments of operation 560 of FIG. 5A.

Referring to FIG. 9, in operation 910, the electronic device 310 (or the processor 315) according to various embodiments may obtain a measurement result of biometric information.

According to various embodiments, in operation 920, the electronic device 310 (or the processor 315) may identify a difference between a measurement result and a stored previous measurement result.

According to various embodiments, in operation 930, the electronic device 310 (or the processor 315) may determine whether the difference between the measurement result and the previous measurement result exceeds a threshold value.

According to an embodiment, when biometric information to be measured is based on the BIA signal, the electronic device 310 (or the processor 315) may identify a measurement result value (e.g., a body phase angle) according to the BIA signal measurement. The electronic device 310 (or the processor 315) may determine whether the difference between the measurement result and the stored previous measurement result exceeds a threshold value (e.g., 0.5).

According to various embodiments, when the difference between the measurement results exceeds the threshold value, in operation 940, the electronic device 310 (or the processor 315) may provide a measurement result and a measurement guide. According to an embodiment, the measurement guide may be information for recommending a biometric information measurement operation. For example, as shown in reference numeral 1000 in FIG. 10, the electronic device 310 may provide a measurement guide for encouraging the continuous execution of the biometric information measurement operation to record and manage the biometric information. According to an embodiment, the measurement guide may be information indicating that an error factor occurs. For example, as shown in reference numeral 1010 of FIG. 10, the electronic device 310 may provide a measurement guide for providing a notification that an error factor may occur because an unnecessary accessory is worn. In this regard, the electronic device 310 may provide guide information for guiding measurement of biometric information after the error factor is removed.

According to various embodiments, when the difference between the measurement results does not exceed the threshold value, in operation 950, the electronic device 310 (or the processor 315) may provide the measurement result. For example, the electronic device 310 may provide auditory information, tactile information, or visual information about the measurement result using the output module 313.

Figure 11:
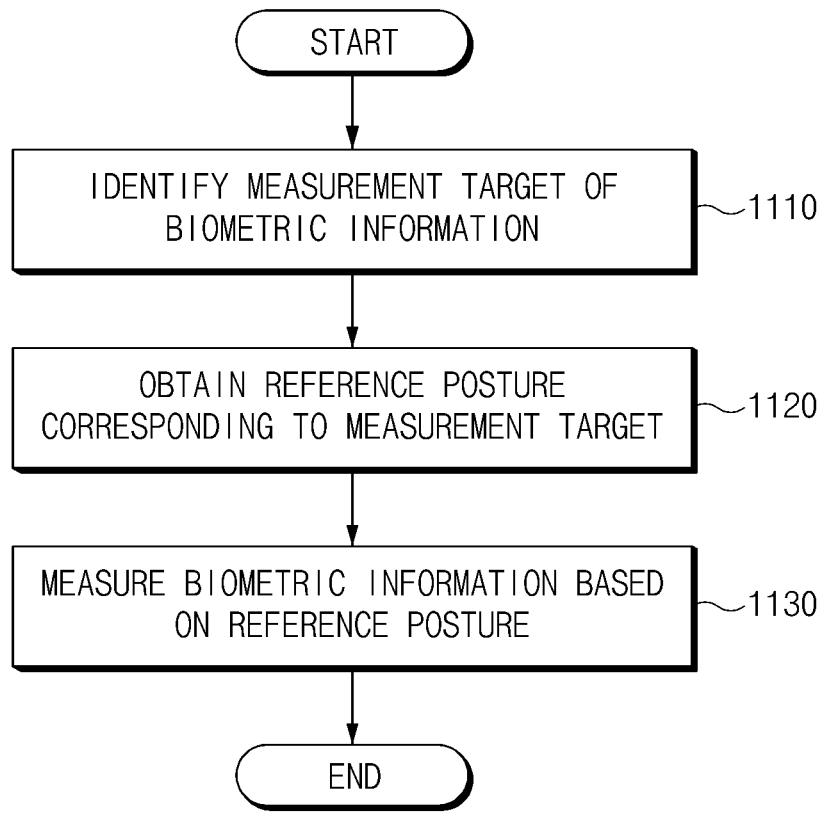
FIG. 11 is a flowchart illustrating an example operation of measuring biometric information in an electronic device, according to various embodiments.
Figure 12:
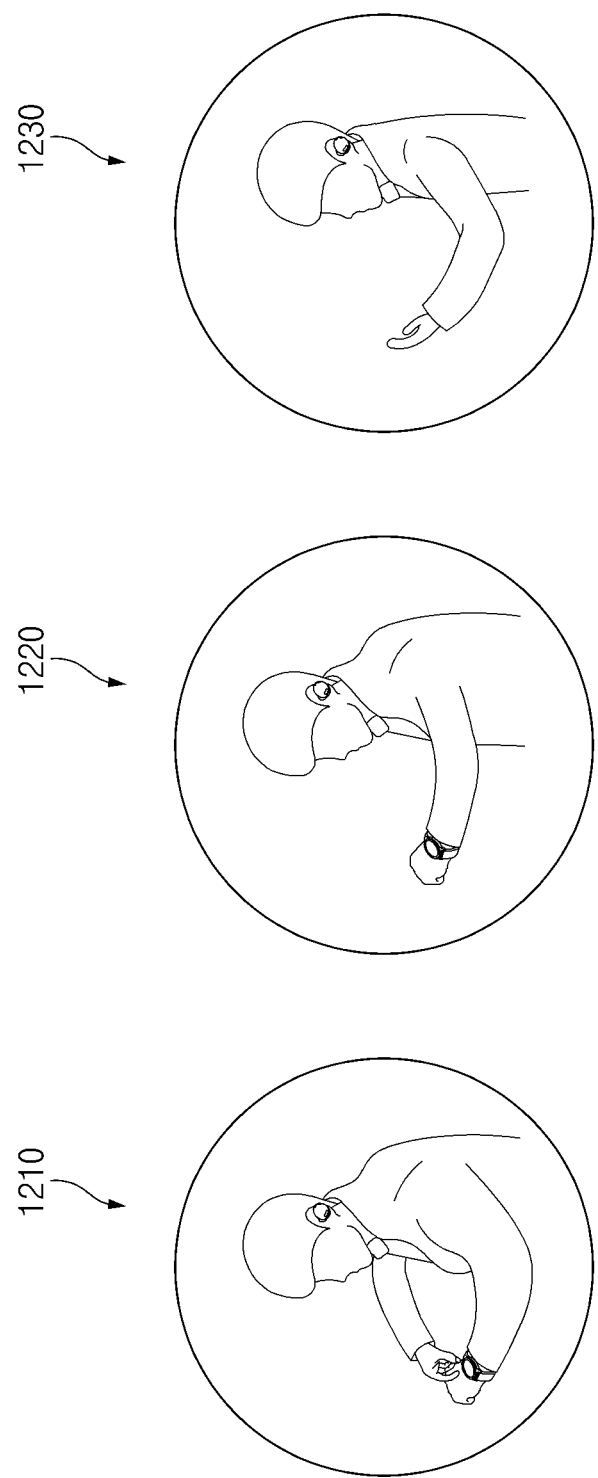
FIG. 12 is a diagram illustrating an example operation of obtaining a reference posture in an electronic device, according to various embodiments.

FIG. 11 is a flowchart illustrating an example operation of measuring biometric information in an electronic device, according to various embodiments. Moreover, FIG. 12 is a diagram for illustrating an example operation of obtaining a reference posture in an electronic device, according to various embodiments. Operations of FIG. 11 described below may indicate various embodiments of operation 510 of FIG. 5A.

Referring to FIG. 11, in operation 1110, the electronic device 310 (or the processor 315) according to various embodiments may determine (identify) a measurement target of biometric information. According to an embodiment, the electronic device 310 may output a list of measurable biometric information through the output module 313 and then may receive a user input for selecting at least one from the list.

According to various embodiments, in operation 1120, the electronic device 310 (or the processor 315) may obtain a reference posture corresponding to the measurement target.

According to an embodiment, when the measurement of body composition based on a BIA signal is determined as a measurement target, as shown reference numeral 1210 of FIG. 12, the electronic device 310 may obtain a reference posture in which the user's armpits are sufficiently wide and crooks of the user's arms do not stick to each other.

According to an embodiment, when the measurement of oxygen saturation is determined as a measurement target, as shown in reference numeral 1220 of FIG. 12, the electronic device 310 may obtain a reference posture that allows the electronic device to take a posture in which the electronic device is positioned at the height of the user's heart and positioned in the center of a chest.

According to an embodiment, when blood pressure measurement using the information measured by a cuff-type blood pressure gauge as a correction value is determined as a measurement target, as shown reference numeral 1230 of FIG. 12, the electronic device 310 may obtain a reference posture that allows a user to take a posture in which blood pressure has been measured using the cuff-type blood pressure gauge. In this regard, the electronic device 310 may obtain a reference posture corresponding to the measurement target among reference postures stored in the electronic device 310. As another example, the electronic device 310 may obtain the reference posture corresponding to the measurement target from the outside (e.g., a health management server) using the communication module 319.

According to various embodiments, in operation 1130, the electronic device 310 (or the processor 315) may measure biometric information based on a reference posture. According to an embodiment, the electronic device 310 may perform at least one operation among operation 520 to operation 570 of FIG. 5A.

Figure 13:
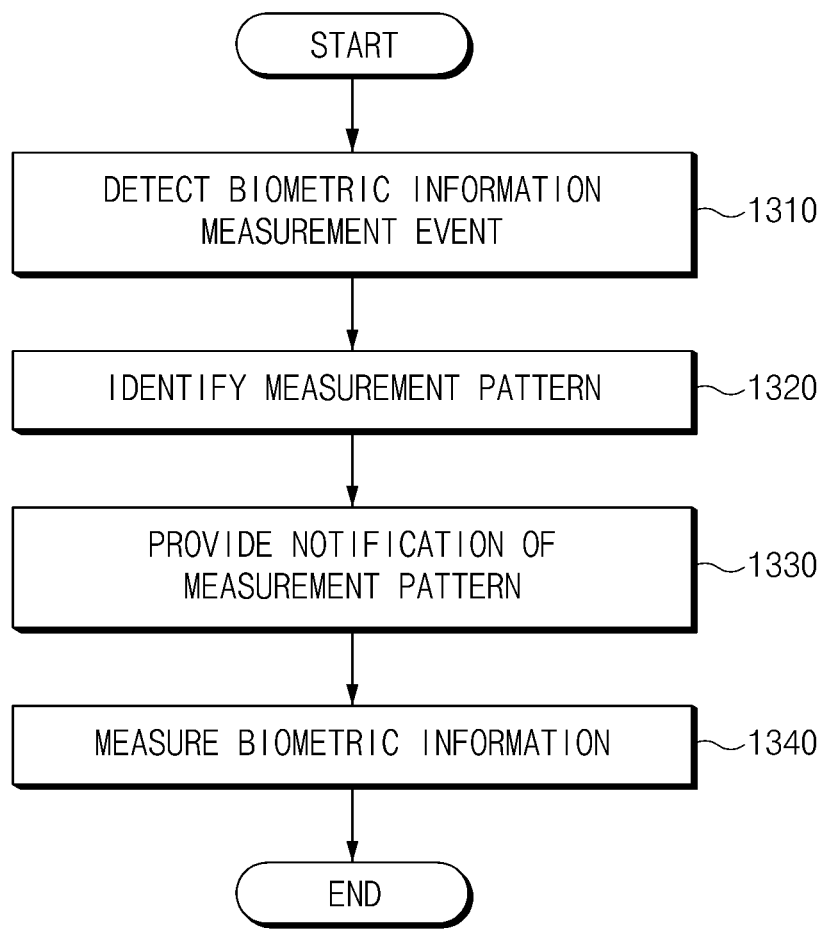
FIG. 13 is a flowchart illustrating an example operation of measuring biometric information in an electronic device, according to various embodiments.
Figure 14:
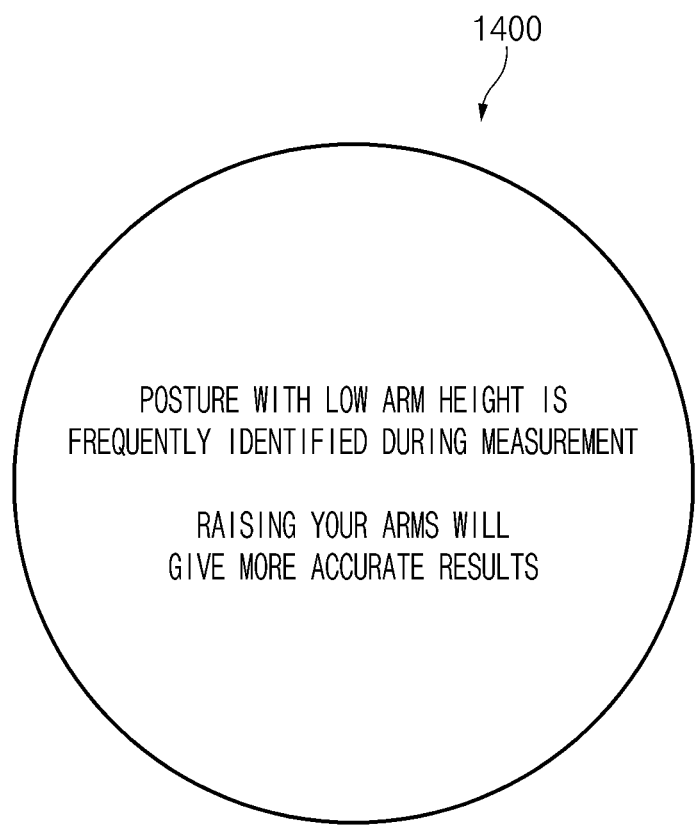
FIG. 14 is a diagram illustrating an example operation of providing a notification of a user's measurement pattern in an electronic device, according to various embodiments.

FIG. 13 is a flowchart illustrating an example operation of measuring biometric information in an electronic device, according to various embodiments. FIG. 14 is a diagram illustrating an example operation of providing a notification of a user's measurement pattern in an electronic device, according to various embodiments. Operations of FIG. 13 described below may indicate various embodiments of operation 510 of FIG. 5A.

Referring to FIG. 13, in operation 1310, the electronic device 310 (or the processor 315) according to various embodiments may detect a biometric information measurement event. According to an embodiment, the electronic device 310 may detect an input to a menu indicating measurement of biometric information.

According to various embodiments, in operation 1320, the electronic device 310 (or the processor 315) may identify a user's measurement pattern. The measurement pattern may be associated with a posture frequently taken by the user when biometric information is measured. According to an embodiment, the electronic device 310 may identify a measurement pattern based on the user's measurement posture identified in the previous operation of obtaining biometric information.

According to various embodiments, in operation 1330, the electronic device 310 (or the processor 315) may provide a notification of a measurement pattern. According to an embodiment, as shown in FIG. 14, the electronic device 310 may output information for guiding the correction of the user's measurement pattern (e.g., a posture with a low arm height is frequently identified during measurement) and measurement posture (e.g., raising your arms will give more accurate results) (1400). As such, the user may recognize the posture to be taken to measure highly reliable biometric information before taking a measurement posture.

According to various embodiments, in operation 1340, the electronic device 310 (or the processor 315) may measure biometric information. According to an embodiment, the electronic device may perform at least one operation among operation 520 to operation 570 of FIG. 5A.

Figure 15:
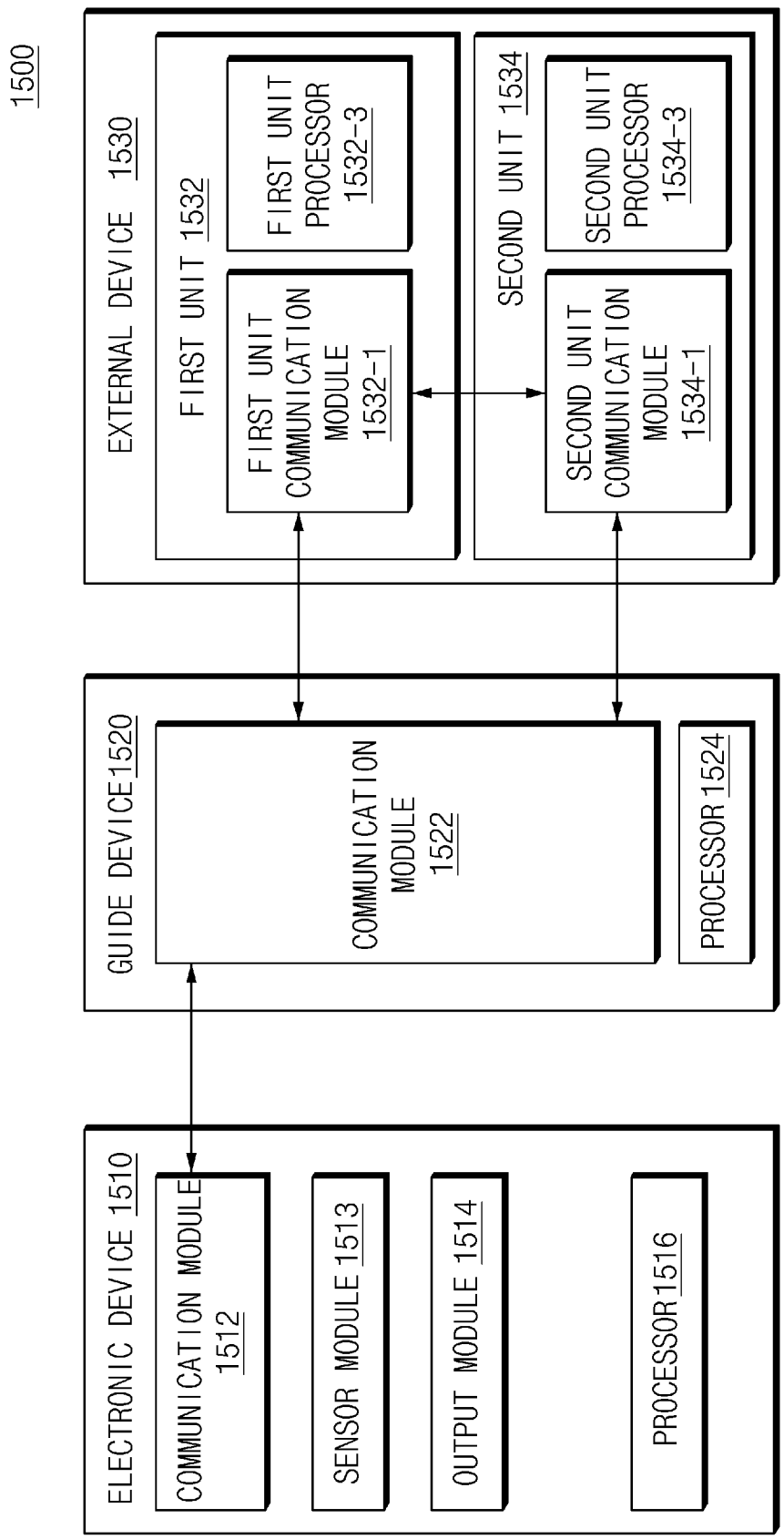
FIG. 15 is a block diagram illustrating an example configuration of a biometric information measuring system, according to various embodiments.

FIG. 15 is a block diagram illustrating an example configuration of a biometric information measuring system, according to various embodiments. FIG. 16 is a diagram illustrating an example electronic device, a guide device, and an external device, according to various embodiments.

Referring to FIG. 15, a biometric information measuring system according to various embodiments may include an electronic device (e.g., a measurement device) 1510, a guide device 1520, and an external device 1530. As compared with the biometric information measuring system shown in FIG. 3A, the biometric information system shown in FIG. 15 is different in that the guide device 1520 determines a user's measurement posture. For example, the electronic device 1510 may be the wearable device described with reference to FIG. 3A. The guide device 1520 may be another electronic device having higher processing performance than the electronic device 1510. For example, as shown in FIG. 16, in a state (e.g., 400 in FIG. 4A) where a user wears the electronic device 1610 and the external devices 1632 and 1634, the user may measure biometric information by taking a measurement posture (e.g., a posture with arms outstretched forward while the arms are opened) (1600). Besides, the guide device 1620 may be worn on the user or may be positioned around the user; and, the guide device 1620 may monitor the user's measurement posture.

According to various embodiments, the electronic device 1510 may include a communication module (e.g., including communication circuitry) 1512, a sensor module (e.g., including at least one sensor) 1513, an output module (e.g., including output circuitry) 1514, and/or a processor (e.g., including processing circuitry) 1516. For example, the communication module 1512, the sensor module 1513 and/or the output module 1514 may be similar or identical to the configuration of the electronic device 310 described above with reference to FIG. 3A. Accordingly, a detailed description thereof may be not be repeated here.

According to various embodiments, as described above with reference to FIG. 3A, the processor 1516 may include various processing circuitry and measure (or obtain) biometric information based on information obtained through the sensor module 1513.

According to an embodiment, in measuring biometric information, the processor 1516 may obtain the measurement posture of the user from the guide device 1520. In this regard, the processor 1516 may output guide information that guides the measurement posture so as to correspond to a reference posture based on the measurement posture obtained from the guide device 1520.

According to various embodiments, the guide device 1520 may include a communication module (e.g., including communication circuitry) 1522 and a processor (e.g., including processing circuitry) 1524. However, this is only an example, and various embodiments of this disclosure are not limited thereto. For example, the guide device 1520 may be implemented to further include configurations not illustrated in FIG. 15.

According to various embodiments, the communication module 1522 of the guide device 1520 may include various communication circuitry and support performing wireless communication with the electronic device 1510 and the external device 1530. According to an embodiment, the communication module 1522 may be a device including hardware and software for transmitting and receiving a signal (e.g., commands or data) between the guide device 1520 and the electronic device 1510 and between the guide device 1520 and the external device 1530.

For example, the communication module 1522 may include a communication module for supporting UWB communication. However, this is only an example, and various embodiments of this disclosure are not limited thereto. For example, the communication module 1522 may include an IrDA communication module, a Wi-Fi communication module, a Wi-Fi Direct communication module, or Bluetooth communication module.

According to various embodiments, the processor 1524 of the guide device 1520 may include various processing circuitry and determine a measurement posture of the user. The processor 1524 may provide the electronic device 1510 with information associated with the determined measurement posture. For example, the processor 1524 may determine the measurement posture based on the location of the electronic device 1510 and the posture of the electronic device 1510.

According to an embodiment, the processor 1524 may determine the location of the electronic device 1510 by transmitting and receiving a predetermined signal based on UWB communication with the electronic device 1510 and the external device 1530. For example, the processor 1524 may obtain a first distance to the electronic device 1510, a second distance to a first unit device 1532 of the external device 1530, a third distance to a second unit device 1534 of the external device 1530, and a fourth distance between the first unit device 1532 and the unit devices 1534 and then may determine the location of the electronic device 1510 based on at least some of them.

According to an embodiment, the processor 1524 may determine the posture of the electronic device 1510 based on sensor information provided from the electronic device 1510. For example, the processor 1524 may determine the posture of the electronic device 1510 by comparing the sensor information provided from the electronic device 1510 with the pre-stored data that is digitized depending on the posture of the electronic device 1510.

According to various embodiments, the external device 1530 may include the first unit device (e.g., an electronic device such as a right earphone) 1532 and the second unit device (e.g., an electronic device such as a left earphone) 1534. According to an embodiment, the first unit device 1532 may include a first unit communication module (e.g., including communication circuitry) 1532-1 and a first unit processor (e.g., including processing circuitry) 1532-3. Similarly, the second unit device 1534 may include a second unit communication module (e.g., including communication circuitry) 1534-1 and a second unit processor (e.g., including processing circuitry) 1534-3. For example, the configuration of the external device 1530 may be similar or identical to the configuration of the external device 320 described above with reference to FIG. 3A. Accordingly, a detailed description thereof may not be repeated here.

In the above-described biometric information measuring system, the location of the electronic device 1510 and the posture of the electronic device 1510 may be determined by the guide device 1520. However, this is only an example, and various embodiments of the disclosure are not limited thereto. For example, one of the location of the electronic device 1510 or the posture of the electronic device 1510 may be determined by the electronic device 1510.

In the above-described biometric information measuring system, guide information may be provided by the electronic device 1510. However, this is only an example, and various embodiments of this disclosure are not limited thereto. For example, the guide information may be provided to the electronic device 1510 by the guide device 1520.

According to various example embodiments, an example method of operating an electronic device (e.g., the electronic device 310) may include: determining a location of the electronic device for a body based on a signal transmitted or received with at least one external device (e.g., the first unit device 322 and the second unit device 324) in response to sensing a biometric information measurement event, determining a posture of the electronic device based on an inertial signal associated with the electronic device, determining a measurement posture (e.g., a measurement posture of a user) based on the location of the electronic device and the posture of the electronic device, and providing a guide to correspond the measurement posture to a predetermined reference posture.

According to various example embodiments, the method of the electronic device may include measuring biometric information based on a biometric signal based on the measurement posture corresponding to the predetermined reference posture.

According to various example embodiments, the method of the electronic device may include monitoring the measurement posture while providing the guide information and outputting information indicating the monitored measurement posture and information indicating the reference posture.

According to various example embodiments, the method of the electronic device may include measuring biometric information about one portion of the body contacting at least one electrode included in the electronic device.

According to various example embodiments, the method of the electronic device may include obtaining fingerprint information through one portion of the body contacting the at least one electrode and determining the measurement posture of the user based on the fingerprint information.

According to various example embodiments, the method of the electronic device may include comparing the biometric information with previously-measured biometric information and determining whether an error factor occurs, based on the comparison.

According to various example embodiments, the method of the electronic device may include obtaining the measurement pattern of the user and providing a notification of the measurement pattern before determining the measurement posture of the user.

According to various example embodiments, the guide information may include at least one of visual information, auditory information, or tactile information.

According to various example embodiments, the operating method of the electronic device may include transmitting and receiving a signal with the at least one external device based on UWB communication.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    an output module comprising output circuitry;
    a communication module comprising communication circuitry configured to communicate with at least one external device;
    a first sensor configured to sense a biometric signal for a body of a user;
    a second sensor configured to sense an inertial signal;
    at least one processor, including processing circuitry, operatively connected to the output module, the communication module, the first sensor, and the second sensor; and
    memory storing instructions,
    wherein the instructions, when executed by the at least one processor, cause the electronic device to:
        sense the biometric signal through the first sensor while the electronic device is worn on a first portion of the body;
        determine a location of the electronic device with respect to the body based on a signal transmitted or received with the at least one external device being worn on a second portion of the body in response to sensing the biometric signal;
        determine a posture of the electronic device based on information obtained through the second sensor;
        determine a measurement posture of the user based on the location of the electronic device and the posture of the electronic device; and
        provide guide information through the output module to correspond the measurement posture to a predetermined reference posture.

2. The electronic device of claim 1, wherein the instructions, when executed by the at least one processor, cause the electronic device to:
    based on the measurement posture corresponding to the predetermined reference posture, measure biometric information based on the biometric signal sensed through the first sensor.

3. The electronic device of claim 1, wherein the instructions, when executed by the at least one processor, cause the electronic device to:
    while providing the guide information,
        monitor the measurement posture; and
        output information indicating the monitored measurement posture and information indicating the reference posture through the output module.

4. The electronic device of claim 1, further comprising:
    at least one electrode connected to the first sensor,
    wherein the instructions, when executed by the at least one processor, cause the electronic device to:
        measure biometric information about one portion of the body contacting the at least one electrode.

5. The electronic device of claim 4, further comprising:
    a fingerprint sensor configured to sense fingerprint information and positioned such that the one portion of the body is in contact based on the one portion of the body contacting the at least one electrode,
    wherein the instructions, when executed by the at least one processor, cause the electronic device to:
        determine the measurement posture of the user based on information obtained through the fingerprint sensor.

6. The electronic device of claim 2, wherein the instructions, when executed by the at least one processor, cause the electronic device to:
    compare the biometric information with previously-measured biometric information;
    determine whether an error factor occurs based on the comparison; and
    provide a notification based on the determining of whether the error factor occurs.

7. The electronic device of claim 1, wherein the instructions, when executed by the at least one processor, cause the electronic device to:
    obtain a measurement pattern of the user; and
    provide a notification of the measurement pattern before determining the measurement posture of the user.

8. The electronic device of claim 1, wherein the communication module includes an ultra-wide band (UWB) communication module.

9. The electronic device of claim 1, wherein the guide information includes at least one of visual information, auditory information, or tactile information.

10. A method of operating an electronic device, the method comprising:
    sensing a biometric signal through a first sensor while the electronic device is worn on a first portion of a body of a user;
    determining a location of the electronic device with respect to the body based on a signal transmitted or received with at least one external device being worn on a second portion of the body in response to sensing the biometric signal;
    determining a posture of the electronic device based on an inertial signal associated with the electronic device;
    determining a measurement posture of the user based on the location of the electronic device and the posture of the electronic device; and
    providing guide information to correspond the measurement posture to a predetermined reference posture.

11. The method of claim 10, further comprising:
    based on the measurement posture corresponding to the predetermined reference posture, measuring biometric information based on a biometric signal.

12. The method of claim 10, further comprising:
    while providing the guide information,
        monitoring the measurement posture; and
        outputting information indicating the monitored measurement posture and information indicating the reference posture.

13. The method of claim 10, further comprising:
measuring biometric information about one portion of the body contacting at least one electrode included in the electronic device.

14. The method of claim 13, further comprising:
obtaining fingerprint information through one portion of the body contacting the at least one electrode; and
determining the measurement posture of the user based on the fingerprint information.

15. The method of claim 11, further comprising:
comparing the biometric information with previously-measured biometric information; and
determining whether an error factor occurs based on the comparison.

16. The method of claim 10, further comprising:
obtaining a measurement pattern of the user; and
providing a notification of the measurement pattern before determining the measurement posture of the user.

17. The method of claim 10, wherein the guide information includes at least one of visual information, auditory information, or tactile information.

18. The method of claim 10, further comprising:
transmitting and receiving a signal with the at least one external device based on UWB communication.

19. A biometric information measuring system comprising:
an electronic device including a first sensor configured to obtain a biometric signal, a second sensor configured to sense an inertial signal, and a communication module comprising communication circuitry, wherein the electronic device is configured to be worn on a first portion of a body of a user;
a first external device configured to communicate with the electronic device, wherein the first external device is configured to be worn on a second portion of the body different from the first portion; and
a second external device configured to communicate with the electronic device, wherein the second external device is configured to be worn on a third portion of the body different from the second portion,
wherein the electronic device is configured to:
determine a posture of the electronic device being worn on the first portion of the body based on information obtained through the second sensor,
determine a location of the electronic device being worn on the first portion of the body relative to the body based on a signal transmitted and received with the first external device being worn on the second portion and the second external device being worn on the third portion,
determine a measurement posture of the user based on the location of the electronic device and the posture of the electronic device,
guide the measurement posture to correspond to a predetermined reference posture, and
measure biometric information based on a biometric signal obtained through the first sensor based on the measurement posture corresponding to a predetermined reference posture.

20. The electronic device of claim 1, wherein the location of the electronic device with respect to the body includes a distance to which the electronic device is spaced from a specified portion of the body.

* * * * *